United States Patent
Fujioka

(10) Patent No.: US 7,987,727 B2
(45) Date of Patent: Aug. 2, 2011

(54) SEMICONDUCTOR PRESSURE SENSOR AND FABRICATION METHOD THEREOF

(75) Inventor: Yasuhide Fujioka, Chitose (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 637 days.

(21) Appl. No.: 12/176,464

(22) Filed: Jul. 21, 2008

(65) Prior Publication Data

US 2009/0031817 A1 Feb. 5, 2009

(30) Foreign Application Priority Data

Aug. 1, 2007 (JP) ................................ 2007-201148

(51) Int. Cl.
*G01L 9/02* (2006.01)
(52) U.S. Cl. ................................ 73/725; 73/753; 73/754
(58) Field of Classification Search .................... 73/725, 73/753, 754
See application file for complete search history.

(56) References Cited

U.S. PATENT DOCUMENTS

| 7,270,012 B2 * | 9/2007 | Yokoyama et al. | 73/754 |
| 7,284,443 B2 * | 10/2007 | Sato et al. | 73/754 |
| 7,451,656 B2 * | 11/2008 | Yokoyama et al. | 73/754 |
| 7,530,276 B2 * | 5/2009 | Sato et al. | 73/754 |
| 7,540,198 B2 * | 6/2009 | Ichikawa | 73/754 |
| 7,624,644 B2 * | 12/2009 | Fujioka | 73/725 |
| 2009/0266170 A1 * | 10/2009 | Murashige et al. | 73/715 |

FOREIGN PATENT DOCUMENTS

JP 06-140640 5/1994

* cited by examiner

*Primary Examiner* — Freddie Kirkland, III
(74) *Attorney, Agent, or Firm* — IPUSA, PLLC

(57) ABSTRACT

A semiconductor pressure sensor is provided that includes a diaphragm, a resistive element arranged at an upper portion of the diaphragm, an insulating film arranged on an upper face of the resistive element and an upper face of the diaphragm, a via that penetrates through a portion of the insulating film and comes into contact with the resistive element, and wiring that is electrically connected to the resistive element through the via. The insulating film includes a concave portion having a bottom face that is substantially flat. The wiring is arranged on the bottom face of the concave portion, and the depth of the concave portion is substantially equal to the thickness of the wiring.

6 Claims, 19 Drawing Sheets

SEMICONDUCTOR PRESSURE SENSOR AND FABRICATION METHOD THEREOF

BACKGROUND OF THE INVENTION

1. Field of the Invention

The present invention relates to a semiconductor pressure sensor including a resistive element formed at a diaphragm, wiring arranged on an insulating film that covers the resistive element and the diaphragm, and a via that is arranged at the insulating film and electrically connects the resistive element and the wiring. The present invention also relates to a method of fabricating such a semiconductor pressure sensor.

2. Description of the Related Art

FIG. 1 is a cross-sectional view of a conventional semiconductor pressure sensor. The illustrated semiconductor pressure sensor 100 of FIG. 1 includes a wiring region J in which wiring 112 is formed and wiring region K in which wiring 113 is formed.

As is shown in FIG. 1, the semiconductor pressure sensor 100 includes a diaphragm 101, a diaphragm supporting element 102, a first resistive element 104, a second resistive element 105, an insulating film 107, vias 108 and 109, wirings 112 and 113, and a protective film 115.

The diaphragm 101 is arranged into a thin film so that it may be deformed when external pressure is applied thereto. The diaphragm supporting element 102 has a frame structure and is arranged around the periphery of the diaphragm 101. The diaphragm supporting element 102 is arranged to be thicker than the diaphragm 101 and is configured to support the diaphragm 101. The diaphragm 101 and the diaphragm supporting element 102 may be created from a silicon substrate, for example.

The first and second resistive elements 104 and 105 are arranged on the upper face 101A of the diaphragm 101. The first resistive element 104 is a reference resistive element that is arranged at approximately the center of the diaphragm 101. The second resistive element 105 is arranged at the periphery of the diaphragm 101.

The insulating film 107 is arranged to cover the upper face 100A of the diaphragm 101 and portions of the upper face of the first and second resistive elements 104 and 105. The upper face 107A of the insulating film 107 is arranged into a flat surface. The insulating film 107 has a through hole 117 exposing the upper face of the first resistive element 104 and a through hole 118 exposing the upper face of the second resistive element 105.

The via 108 is arranged within the through hole 117. The lower end portion of the via 108 is arranged to be in contact with the first resistive element 104. The via 109 is arranged within the through hole 118. The lower end portion of the via 109 is arranged to be in contact with the second resistive element 105.

The wiring 112 is arranged on a portion of the upper face 107A of the insulating film 107 corresponding to the location where the via 108 is formed (i.e., wiring region J). The lower face of the wiring 112 is arranged to be in contact with the upper end portion of the via 108. In this way, the wiring 112 may be electrically connected to the first resistive element 104 through the via 108.

The wiring 113 is arranged on a portion of the upper face 107A of the insulating film 107 corresponding to the location where the via 109 is formed (i.e., wiring region K). The lower face of the wiring 113 is arranged to be in contact with the upper end portion of the via 109. In this way, the wiring 113 may be electrically connected to the second resistive element 105 through the via 109.

The protective film 115 is arranged to cover the wirings 112, 113, and the upper face 107A of the insulating film 107. The protective film 115 is for protecting the wirings 112 and 113.

When pressure is applied to the diaphragm 101 and the diaphragm 101 is deformed as a result, the semiconductor pressure sensor 100 having the above-described configuration may detect the pressure applied to the diaphragm 101 based on the difference in the resistance values of the first and second resistive elements 104 and 105 (e.g., see Japanese Laid-Open Patent Publication No. 6-140640).

However, in the above-described conventional semiconductor pressure sensor 100, the wirings 112 and 113 are formed on the upper face 107A of the insulating film 107 which is arranged into a flat surface so that a difference is created in the thickness of the structures formed on portions of the diaphragm 101 corresponding to the wiring regions J and K (i.e., structure including the insulating film 107, the via 108 or 109, and the wiring 112 or 113) and the thickness of the structures arranged on portions of the diaphragm 101 surrounding the wiring regions J and K (i.e., insulating film 107). As a consequence, a difference is created in the amount of deformation occurring at the portions of the diaphragm 101 corresponding to the wiring regions J and K and the amount of deformation occurring at the portions of the diaphragm 101 surrounding the wiring regions J and K so that detection accuracy for detecting the pressure applied to the diaphragm 101 may be degraded.

SUMMARY OF THE INVENTION

Aspects of the present invention are directed to providing a semiconductor pressure sensor that has improved detection accuracy for detecting a pressure applied to its diaphragm and a method of fabricating such a semiconductor pressure sensor.

According to one embodiment of the present invention, a semiconductor pressure sensor is provided that includes:

a diaphragm, a resistive element arranged at an upper portion of the diaphragm;

an insulating film arranged on an upper face of the resistive element and an upper face of the diaphragm;

a via that penetrates through a portion of the insulating film and comes into contact with the resistive element; and wiring that is electrically connected to the resistive element through the via;

wherein the insulating film includes a concave portion having a bottom face that is substantially flat;

the wiring is arranged on the bottom face of the concave portion; and a depth of the concave portion is substantially equal to a thickness of the wiring.

According to another embodiment of the present invention, a method is provided for fabricating a semiconductor pressure sensor including a diaphragm, a resistive element arranged at the diaphragm, and wiring that is electrically connected to the resistive element through a via, the method including:

a resistive element formation step of forming the resistive element at an upper portion of a semiconductor substrate corresponding to a base material of the diaphragm;

a first insulating film formation step of forming a first insulating film on an upper face of the semiconductor substrate that has the resistive element formed by the resistive element formation step;

a through hole formation step of etching a portion of the first insulating film and forming a through hole that penetrates through the first insulating film and exposes a portion of the resistive element;

a concave portion formation step of forming a second insulating film on the portion of the resistive element exposed by the through hole, and forming a concave portion having a bottom face that is defined by an upper face of the second insulating film and a depth that is substantially equal to a thickness of the wiring to be formed at the concave portion;

a via formation step of forming the via that penetrates through a portion of the second insulating film and comes into contact with the resistive element;

a wiring formation step of forming the wiring on the bottom face of the concave portion; and a diaphragm formation step of forming the diaphragm by etching the semiconductor substrate after the wiring formation step.

DETAILED DESCRIPTION OF THE PREFERRED EMBODIMENTS

In the following, preferred embodiments of the present invention are described with reference to the accompanying drawings.

Figure 1:
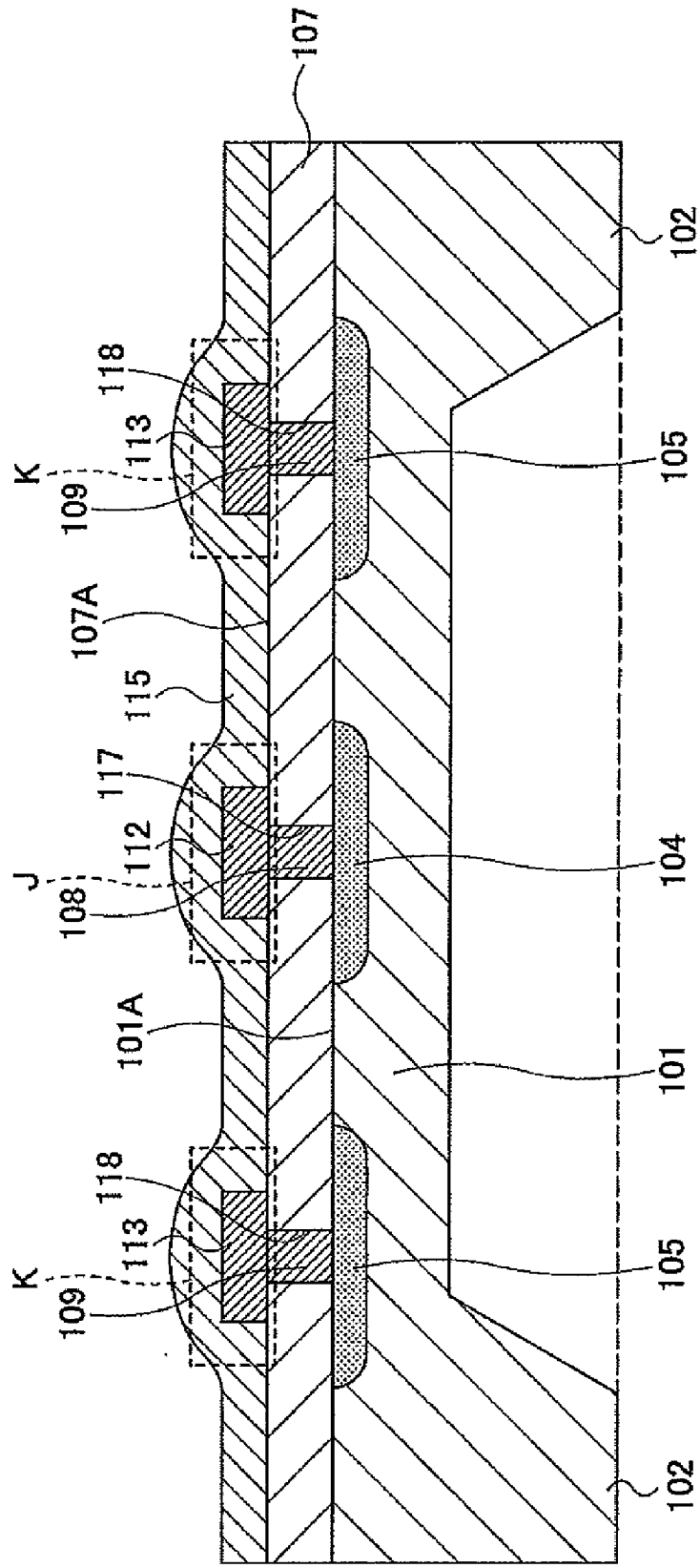
FIG. 1 is a cross-sectional view of a conventional semiconductor pressure sensor.
Figure 2:
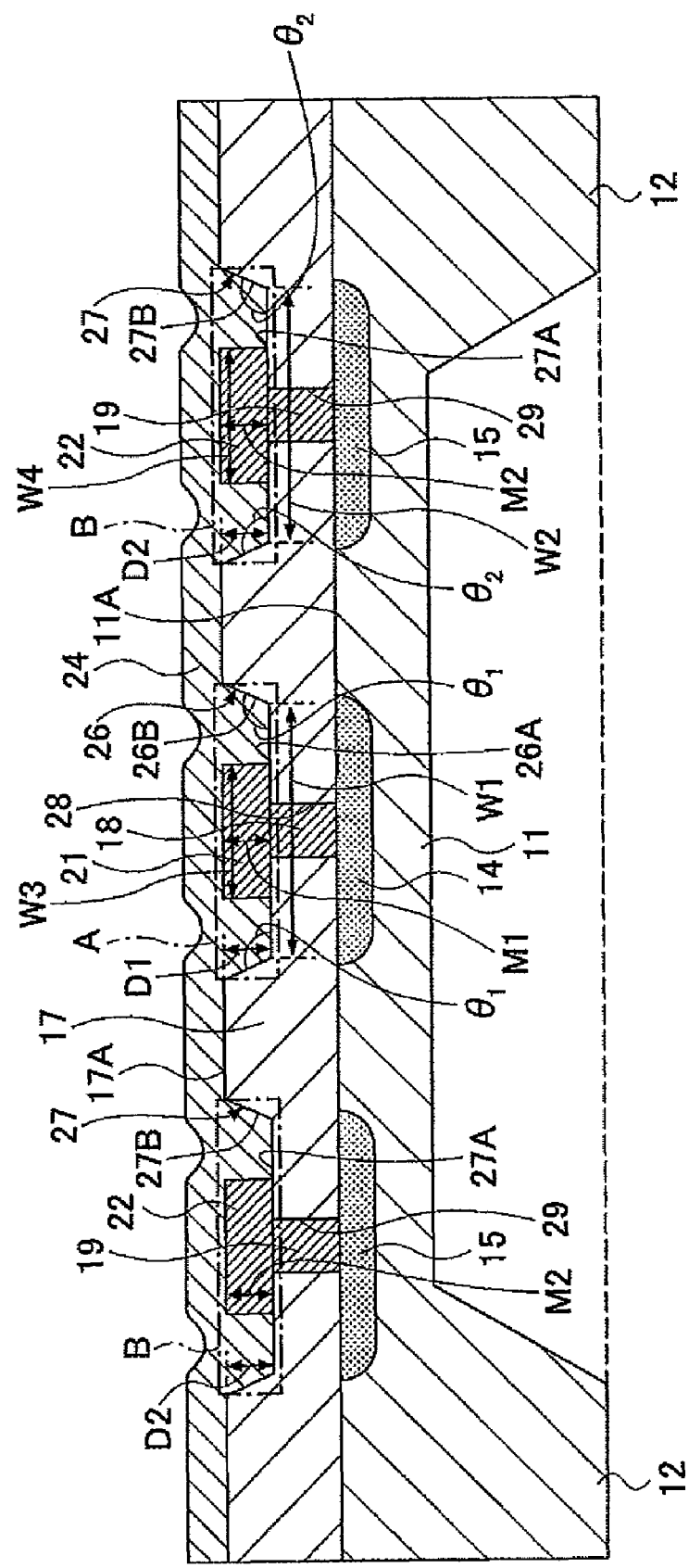
FIG. 2 is a cross-sectional view of a semiconductor pressure sensor according to a first embodiment of the present invention.

FIG. 2 is a cross-sectional view of a semiconductor pressure sensor according to a first embodiment of the present invention.

As is shown in FIG. 2, the semiconductor pressure sensor 10 according to the first embodiment includes a diaphragm 11, a diaphragm supporting element 12, a first resistive element 14, a second resistive element 15, an insulating film 17, vias 18 and 19, wirings 21 and 22, and a protective film 24.

The diaphragm 11 is arranged into a thin film so that it may deform when external pressure is applied thereto. The diaphragm 11 may be arranged to have a thickness of 40 μm, for example.

The diaphragm supporting element 12 has a frame structure and is arranged around the periphery of the diaphragm 11. The diaphragm supporting element 102 is arranged to be thicker than the diaphragm 101 and may have a thickness of 400 μm, for example. The diaphragm supporting element 12 is configured to support the diaphragm 101. In one embodiment, the diaphragm 101 and the diaphragm supporting element 102 may be created from a semiconductor substrate, particularly, as a silicon substrate.

The first and second resistive elements 14 and 15 are arranged on the upper face 11A of the diaphragm 11. The first resistive element 14 is a reference resistive element that is arranged at approximately the center of the diaphragm 11. The second resistive element 15 is arranged at the periphery of the diaphragm 11. It is noted that in a case where the diaphragm 11 is created from an N type semiconductor substrate, the first and second resistive elements 14 and 15 may be formed by diffusing a P type impurity within the diaphragm 11, for example.

The insulating film 17 is arranged to cover the upper face 11A of the diaphragm 11 and portions of the upper face of the first and second resistive elements 14 and 15. The insulating film 17 includes concave portions 26 and 27, and through holes 28 and 29. The concave portion 26 is formed at a portion of the insulating film 17 where the wiring 21 is formed (referred to as 'wiring region A' hereinafter). The wiring 21 is formed on the bottom face 26A of the concave portion 26 which is arranged into a flat surface. The depth D1 of the concave portion 26 is arranged to be substantially equal to the thickness M1 of the wiring 21. For example, if the thickness M1 of the wiring 21 is 1 µm, the depth D1 of the concave portion 26 may also be 1 µm. Also, if the width W3 of the wiring 21 is 1 µm, the width W1 of the bottom portion of the concave portion 26 may be 2 µm, for example.

By arranging the depth D1 of the concave portion 26 to be substantially equal to the thickness M1 of the wiring 21, the upper face of the wiring 21 and the upper face of the insulating film 17 may be substantially coplanar. In other words, the thickness of the structure formed on the portion of the diaphragm 11 corresponding to the wiring region A (i.e., structure including the insulating film 17, the via 18, and the wiring 21) may be substantially equal to the thickness of the structure formed on the portion of the diaphragm 11 surrounding the wiring region A (i.e., insulating film 17). In this way, the difference in the amount of deformation occurring at the portion of the diaphragm 11 corresponding to the wiring region A and the amount of deformation occurring at the portion of the diaphragm 11 surrounding the wiring region A may be reduced, and detection accuracy for detecting the pressure applied to the diaphragm 11 may be improved.

The side face 26B of the concave portion 26 is inclined so that the diameter of the opening of the concave portion 26 defined by the side face 26B is larger at the upper edge side of the concave portion 26 and becomes smaller toward the bottom face 26A of the concave portion 26. For example, the angle $\theta_1$ formed by the bottom face 26A of the concave portion 26A and the side face 26B of the concave portion 26 may be 120 degrees.

By arranging the side face 26B of the concave portion 26 to be inclined so that the diameter of the opening of the concave portion 26 is larger at the upper edge side of the concave portion 26 and becomes smaller toward the bottom face 26A of the concave portion 26, the protective film 24 may be arranged to adequately fill the space created between the side face 26B of the concave portion 26 and the wiring 21.

The concave portion 27 is formed at a portion of the insulating film 17 where the wiring 22 is formed (referred to as 'wiring region B' hereinafter). The wiring 22 is formed on the bottom face 27A of the concave portion 27 which is arranged into a flat surface. The depth D2 of the concave portion 27 is arranged to be substantially equal to the thickness M2 of the wiring 22. For example, if the thickness M2 of the wiring 22 is 1 µm, the depth D2 of the concave portion 27 may also be 1 µm. Also, if the width W4 of the wiring 22 is 1 µm, the width W2 of the bottom portion of the concave portion 27 may be 2 µm, for example.

By arranging the depth D2 of the concave portion 27 to be substantially equal to the thickness M2 of the wiring 22, the upper face of the wiring 22 and the upper face of the insulating film 17 may be substantially coplanar. In other words, the thickness of the structure formed on the portion of the diaphragm 11 corresponding to the wiring region B (i.e., structure including the insulating film 17, the via 19, and the wiring 22) may be substantially equal to the thickness of the structure formed on the portion of the diaphragm 11 surrounding the wiring region B (i.e., insulating film 17). In this way, the difference in the amount of deformation occurring at the portion of the diaphragm 11 corresponding to the wiring region B and the amount of deformation occurring at the portion of the diaphragm 11 surrounding the wiring region B may be reduced, and detection accuracy for detecting the pressure applied to the diaphragm 11 may be improved.

The side face 27B of the concave portion 27 is inclined so that the diameter of the opening of the concave portion 27 defined by the side face 27B is larger at the upper edge side of the concave portion 27 and becomes smaller toward the bottom face 27A of the concave portion 27. For example, the angle $\theta_2$ formed by the bottom face 27A of the concave portion 27A and the side face 27B of the concave portion 27 may be 120 degrees.

By arranging the side face 27B of the concave portion 27 to be inclined so that the diameter of the opening of the concave portion 27 is larger at the upper edge side of the concave portion 27 and becomes smaller toward the bottom face 27A of the concave portion 27, the protective film 24 may be arranged to adequately fill the space created between the side face 27B of the concave portion 27 and the wiring 22. It is noted that the insulating film 17 may be an oxide film, for example.

The through hole 28 is arranged to penetrate through the portion of the insulating film 17 corresponding to the wiring region A. The through hole 28 exposes the upper face of the first resistive element 14. The through hole 29 is arranged to penetrate though the portion of the insulating film 17 corresponding to the wiring region B. The through hole 29 exposes the upper face of the second resistive element 15.

The via 18 is arranged within the through hole 28. The lower end portion of the via 18 is arranged to be in contact with the first resistive element 14. The via 19 is arranged within the through hole 29. The lower end portion of the via 19 is arranged to be in contact with the second resistive element 15. It is noted that the vias 18 and 19 may be made of aluminum (Al), for example.

The wiring 21 is arranged on the bottom face 26A of the concave portion 26. The lower face of the wiring 21 is arranged to be in contact with the upper end portion of the via 18. In this way, the wiring 21 may be electrically connected to the first resistive element 14 through the via 18. The thickness M1 of the wiring 21 may be 1 µm, and the width W3 of the wiring 21 may be 1 µm, for example. The wiring 22 is arranged on the bottom face 27A of the concave portion 27. The lower face of the wiring 22 is arranged to be in contact with the upper end portion of the via 19. In this way, the wiring 22 may be electrically connected to the second resistive element 15 through the via 19. The thickness M2 of the wiring 22 may be 1 µm, and the width W4 of the wiring 22 may be 1 µm, for example. It is noted that the wirings 21 and 22 may be made of aluminum (Al), for example.

The protective film 24 is arranged to cover the wirings 21 and 22 and the upper face of the insulating film 17 having the concave portions 26 and 27 formed thereon. The protective film 24 is for protecting the wirings 21 and 22. It is noted that an oxide film may be used as the protective film 24, for example. Also, the thickness of the protective film 24 may be 1 µm, for example.

As can be appreciated from the above descriptions, in the semiconductor pressure sensor 10 according to the first embodiment of the present invention, the concave portion 26 is formed at the portion of the insulating film 17 corresponding to the wiring region A where the wiring 21 is formed, the depth D1 of the concave portion 26 being arranged to be substantially equal to the thickness M1 of the wiring 21; and the concave portion 27 is formed at the portion of the insulating film 17 corresponding to the wiring region B where the wiring 22 is formed, the depth D2 of the concave portion 27 being arranged to be substantially equal to the thickness M2 of the wiring 22. In this way, the thickness of the structures formed on the portions of the diaphragm 11 corresponding to the wiring regions A and B may be substantially equal to the thickness of the structures formed on portions of the insulating film 17 surrounding the wiring regions A and B. In turn, the difference between the amount of deformation occurring at the portions of the diaphragm 11 corresponding to the wiring regions A and B and the amount of deformation occurring at the portions of the diaphragm 11 surrounding the wiring regions A and B may be reduced so that detection accuracy may be improved for detecting the pressure applied to the diaphragm 11.

FIGS. 3-10 are diagrams illustrating process steps for fabricating the semiconductor pressure sensor 10 according to the first embodiment of the present invention. It is noted that in these drawings, component elements that are identical to those described above in relation to FIG. 2 are given the same reference numbers.

Figure 3:
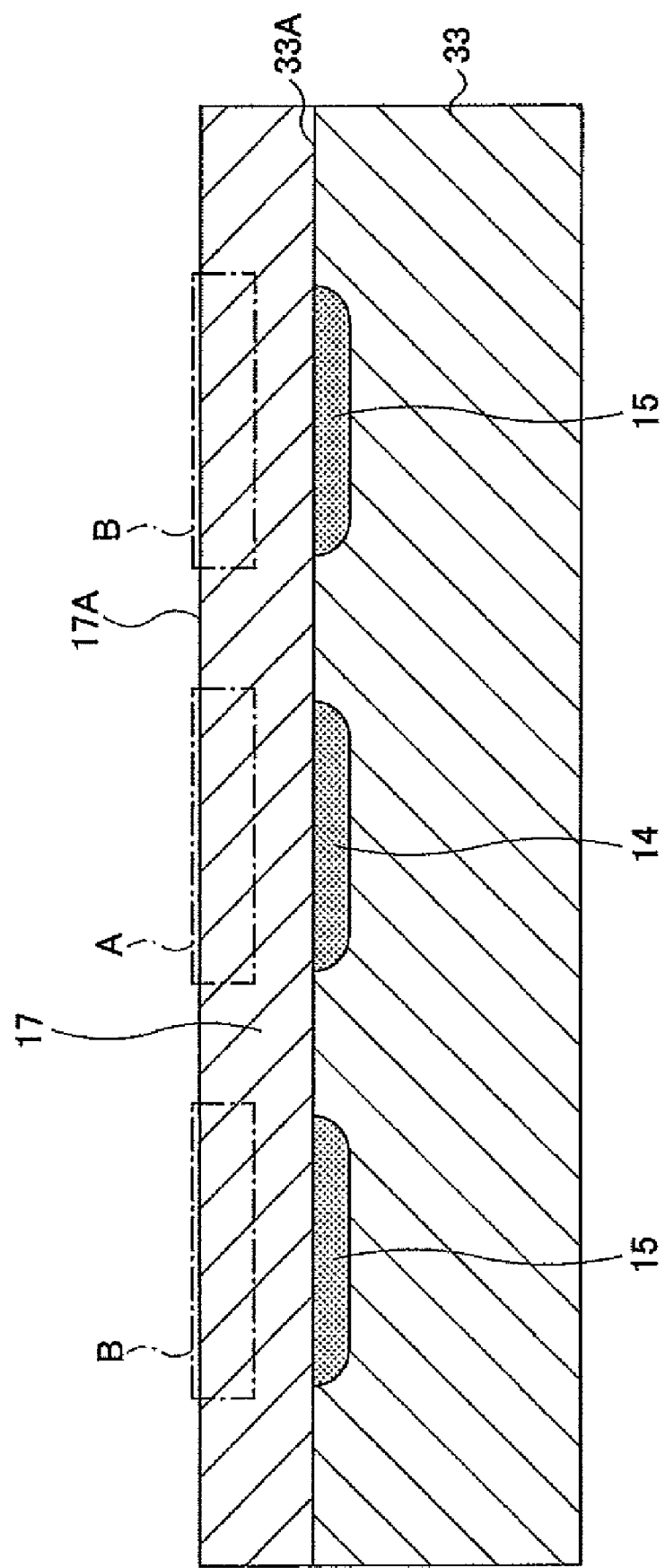
FIG. 3 is a diagram illustrating a process step for fabricating the semiconductor pressure sensor according to the first embodiment.

In the process step illustrated in FIG. 3, conventional techniques may be used to successively form the first and second resistive elements 14, 15, and the insulating film 17 on a semiconductor substrate 33 corresponding to a base material of the diaphragm 11 and the diaphragm supporting element 12. In one embodiment, a silicon substrate may be used as the semiconductor substrate 33. The thickness of the semiconductor substrate 33 may be 400 μm, for example. It is noted that in a case where an N type semiconductor substrate is used as the semiconductor substrate 337 the first and second resistive elements 14 and 15 may be formed by diffusing a P type impurity within the semiconductor substrate 33, for example. The insulating film 17 may be an oxide film, for example. It is noted that conventional film formation techniques such as chemical vapor deposition (CVD) or thermal oxidation may be used to form the insulating film 17. The thickness of the insulating film 17 may be 1 μm, for example.

Figure 4:
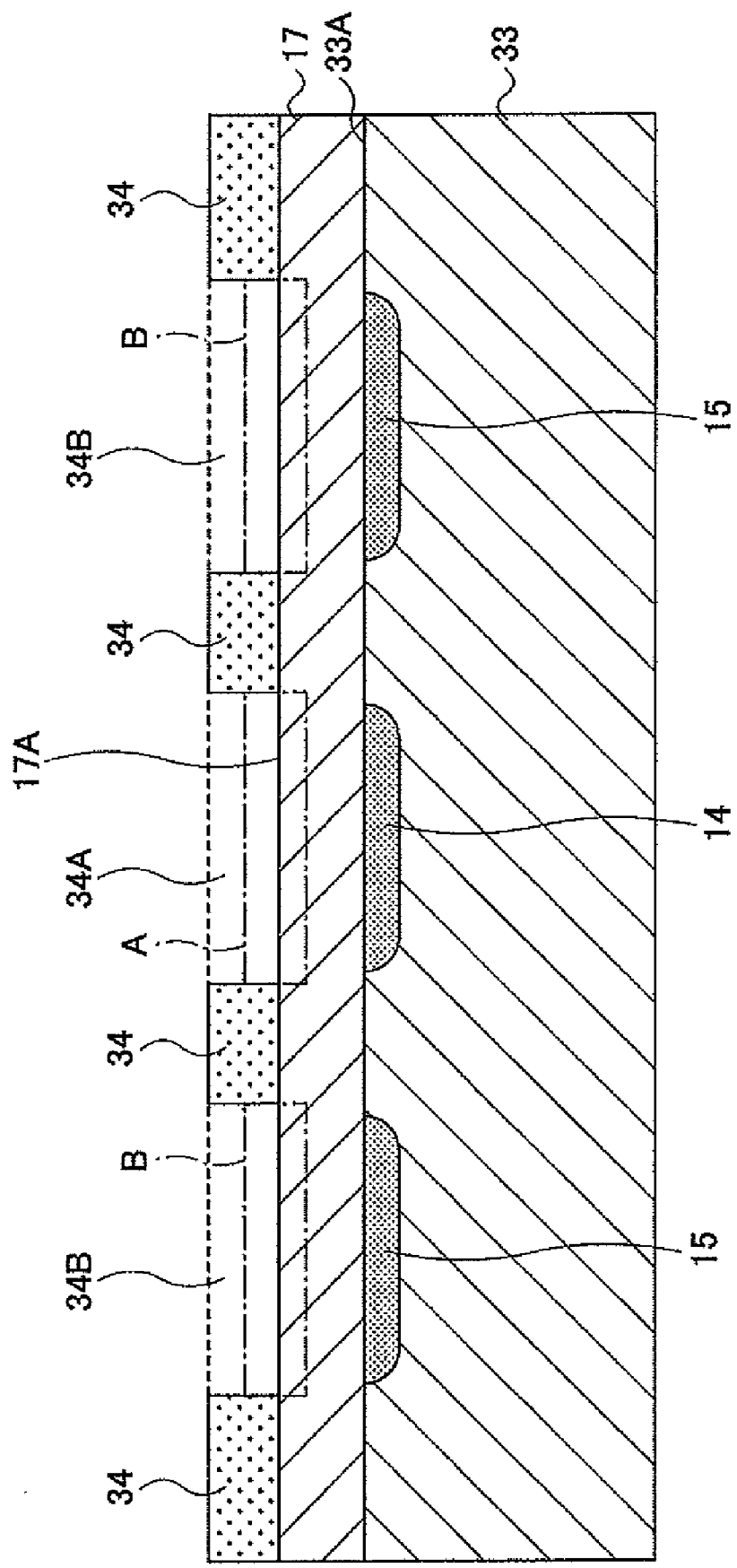
FIG. 4 is a diagram illustrating a subsequent process step to be performed after the process step of FIG. 3 for fabricating the semiconductor pressure sensor according to the first embodiment.

Next, in the process step illustrated in FIG. 4, a resist film 34 having openings 34A and 34B is formed on the insulating film 17. The opening 34A is arranged to expose a portion of the upper face 17A of the insulating film 17 corresponding to the wiring region A. The opening 34B is arranged to expose a portion of the upper face 17A of the insulating film 17 corresponding to the wiring region B.

Figure 5:
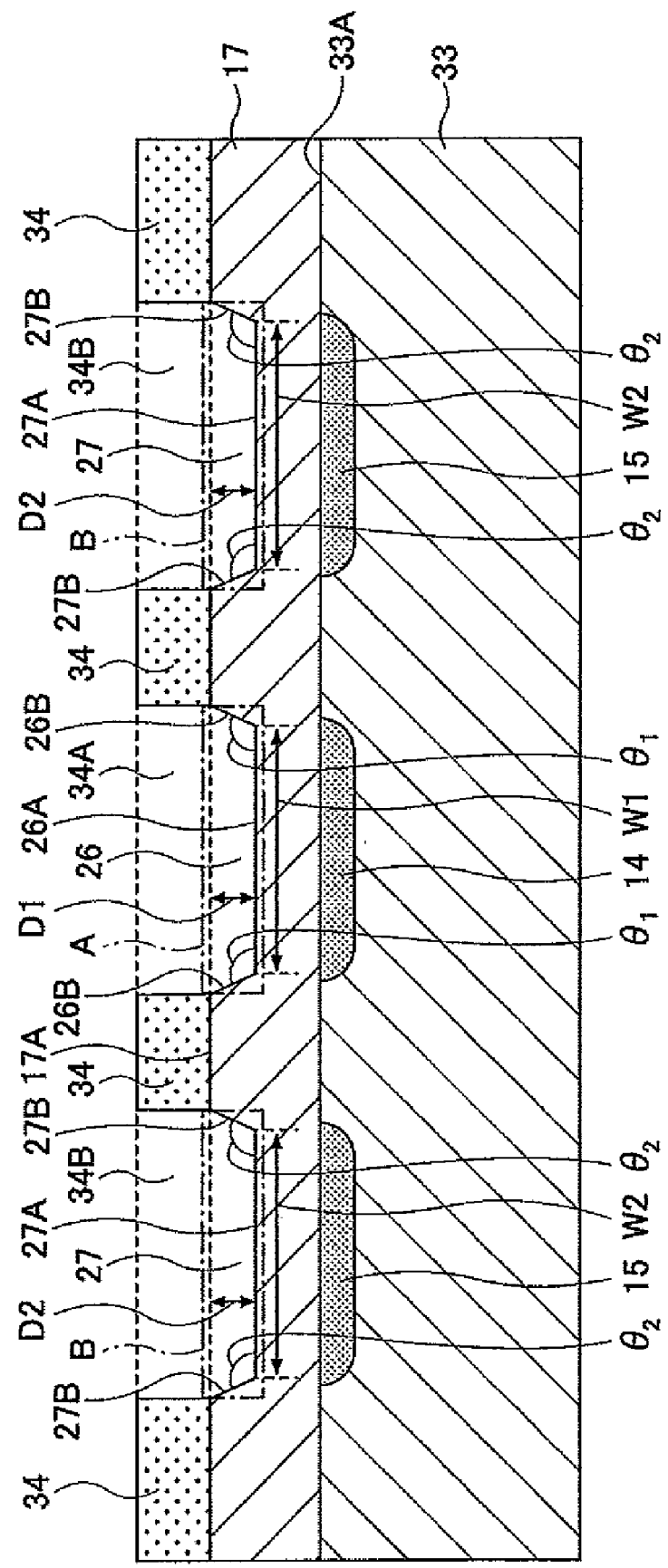
FIG. 5 is a diagram illustrating a subsequent process step to be performed after the process step of FIG. 4 for fabricating the semiconductor pressure sensor according to the first embodiment.

Next, in the process step illustrated in FIG. 5, the resist film 34 is used as a mask to perform an etching process (e.g., dry etching or wet etching) on the insulating film 17 to form the concave portion 26 on the portion of the insulating film 17 corresponding to the wiring region A and the concave portion 27 on the portion of the insulating film 17 corresponding to the wiring region B.

In this case, the depth D1 of the concave portion 26 is arranged to be substantially equal to the thickness M1 of the wiring 21. For example, if the thickness M1 of the wiring 21 is 1 μm, the depth D1 of the concave portion 26 may be 1 μm as well. Also, if the width W3 of the wiring 21 is 1 μm, the width W1 of the bottom portion of the concave portion 26 may be 2 μm, for example.

By arranging the depth D1 of the concave portion 26 to be substantially equal to the thickness M1 of the wiring 21, the upper face of the wiring 21 formed on the bottom face 26A of the concave portion 26 and the upper face 17A of the insulating film 17 may be substantially coplanar. In other words, the thickness of the structure formed on the portion of the diaphragm 11 corresponding to the wiring region A (i.e., structure including the insulating film 17, the via 18, and the wiring 21) and the thickness of the structure formed on the portion of the diaphragm 11 surrounding the wiring region A (i.e., insulating film 17) may be substantially equal. In this way, the difference between the amount of deformation occurring at the portion of the diaphragm 11 corresponding to the wiring region A and the amount of deformation occurring at the portion of the diaphragm 11 surrounding the wiring region A may be reduced so that detection accuracy may be improved for detecting the pressure applied to the diaphragm 11.

Also, the side face 26B of the concave portion 26 is arranged to be inclined so that the diameter of the opening of the concave portion 26 defined by the side face 26B is larger at the upper edge side of the concave portion 26 and becomes smaller toward the bottom face 26A of the concave portion 26.

By arranging the side face 26B of the concave portion 26 to be inclined so that the diameter of the opening of the concave portion 26 is larger at the upper edge side of the concave portion 26 and becomes smaller toward the bottom face 26A of the concave portion 26, the protective film 24 may be arranged to adequately fill the space created between the side face 26B of the concave portion 26 and the wiring 21. For example, the angle $\theta_1$ formed by the bottom face 26A of the concave portion 26A and the side face 26B of the concave portion 26 may be 120 degrees.

The depth D2 of the concave portion 27 is arranged to be substantially equal to the thickness M2 of the wiring 22. For example, if the thickness M2 of the wiring 22 is 1 μm, the depth D2 of the concave portion 27 may be 1 μm as well. Also, if the width W4 of the wiring 22 is 1 μm, the width W2 of the bottom portion of the concave portion 27 may be 2 μm, for example.

By arranging the depth D2 of the concave portion 27 to be substantially equal to the thickness M2 of the wiring 22, the upper face of the wiring 22 and the upper face of the insulating film 17 may be substantially coplanar. In other words, the thickness of the structure formed on the portion of the diaphragm 11 corresponding to the wiring region B (i.e., structure including the insulating film 17, the via 19, and the wiring 22) may be substantially equal to the thickness of the structure formed on the portion of the diaphragm 11 surrounding the wiring region B (i.e., insulating film 17). In this way, the difference in the amount of deformation occurring at the portion of the diaphragm 11 corresponding to the wiring region B and the amount of deformation occurring at the portion of the diaphragm 11 surrounding the wiring region B may be reduced, and detection accuracy may be improved for detecting the pressure applied to the diaphragm 11.

The side face 27B of the concave portion 27 is arranged to be inclined so that the diameter of the opening of the concave portion 27 defined by the side face 27B is larger at the upper edge side of the concave portion 27 and becomes smaller toward the bottom face 27A of the concave portion 27.

By arranging the side face 27B of the concave portion 27 to be inclined so that the diameter of the opening of the concave portion 27 is larger at the upper edge side of the concave portion 27 and becomes smaller toward the bottom face 27A of the concave portion 27, the protective film 24 may be arranged to adequately fill the space created between the side face 27B of the concave portion 27 and the wiring 22. For example, the angle $\theta_2$ formed by the bottom face 27A of the concave portion 27A and the side face 27B of the concave portion 27 may be 120 degrees.

Figure 6:
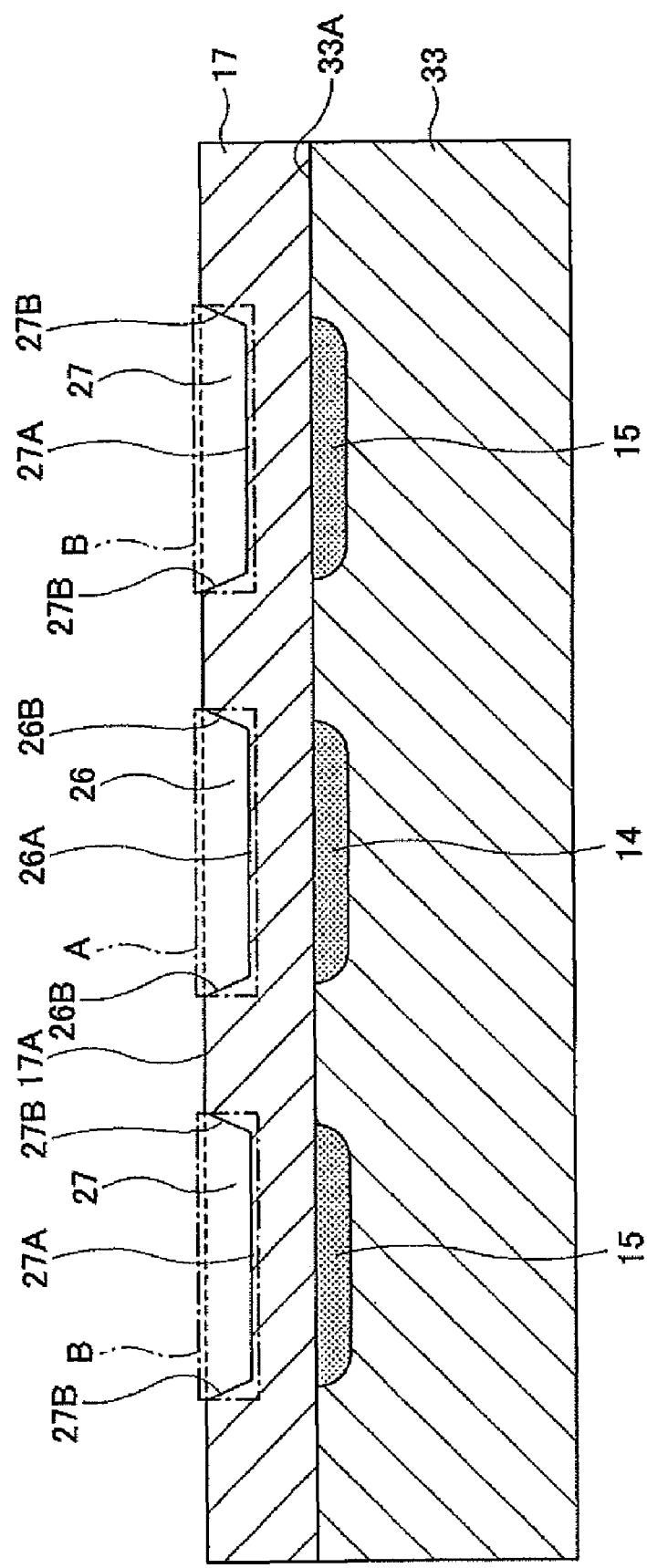
FIG. 6 is a diagram illustrating a subsequent process step to be performed after the process step of FIG. 5 for fabricating the semiconductor pressure sensor according to the first embodiment.

Next, in the process step illustrated in FIG. 6, the resist layer 34 shown in FIG. 5 is removed. Then, in the process step illustrated in FIG. 7, an etching process according to a known technique is performed on the portion of the insulating film 17 corresponding to the wiring regions A and B to form the through holes 28 and 29. Specifically, the through hole 28 is arranged to expose the first resistive element 15, and the through hole 29 is arranged to expose the second resistive element 15.

Figure 7:
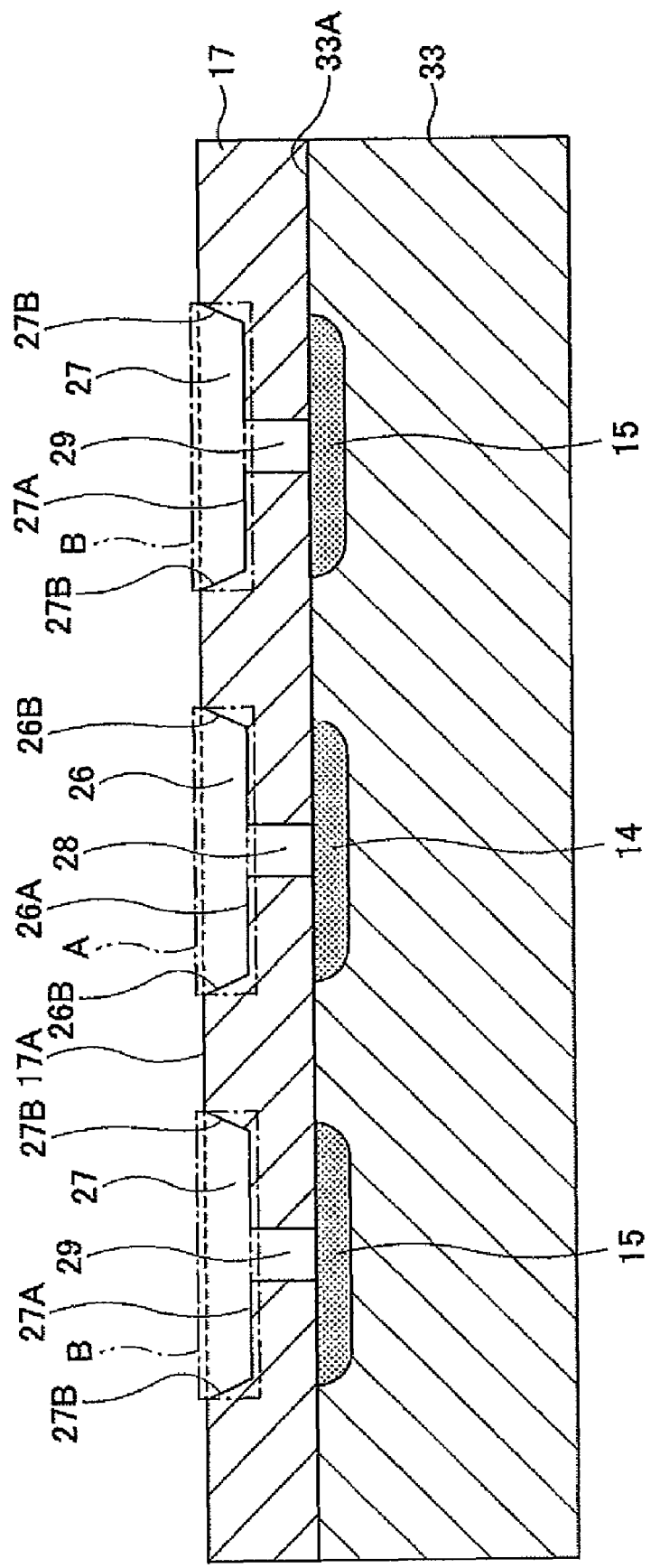
FIG. 7 is a diagram illustrating a subsequent process step to be performed after the process step of FIG. 6 for fabricating the semiconductor pressure sensor according to the first embodiment.
Figure 8:
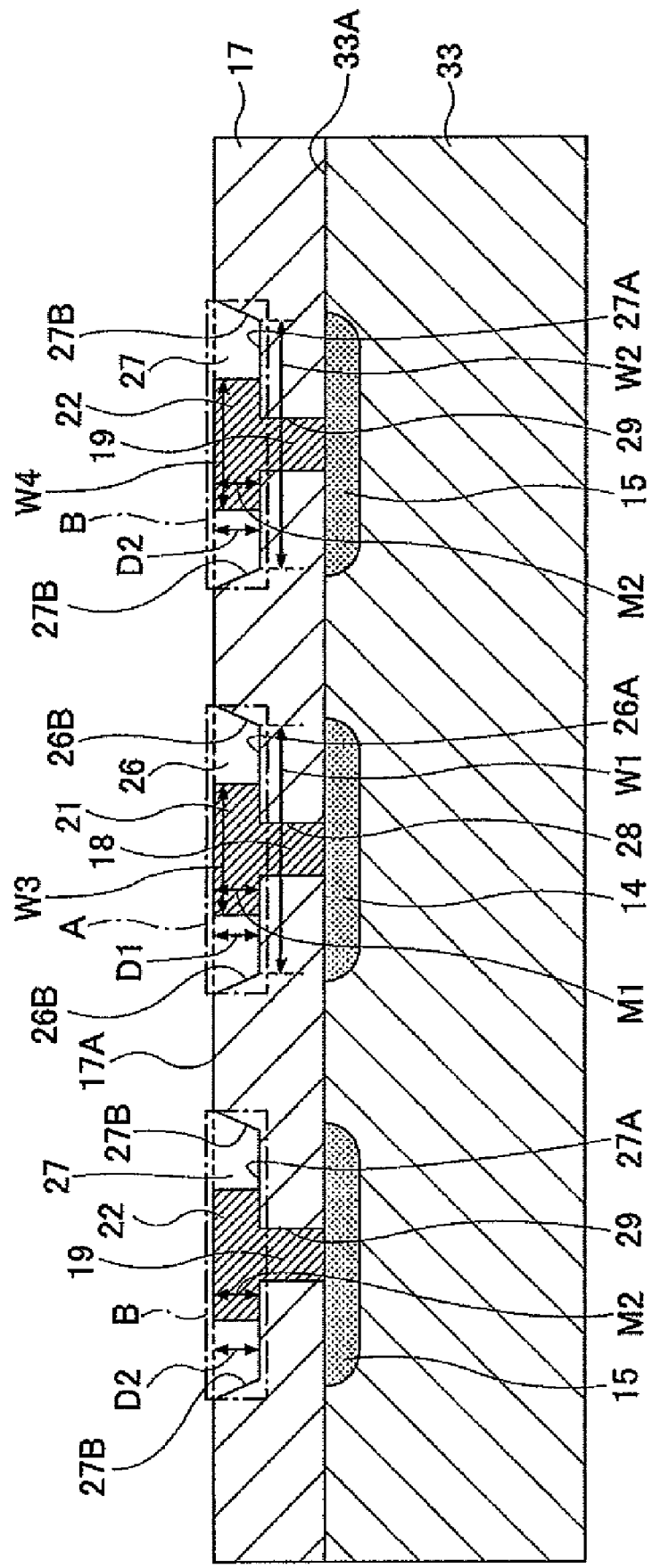
FIG. 8 is a diagram illustrating a subsequent process step to be performed after the process step of FIG. 7 for fabricating the semiconductor pressure sensor according to the first embodiment.

Next, in the process step illustrated in FIG. 8, the vias 18, 19, and the wirings 21 and 22 are formed at the same time. Specifically, a metal film may be arranged to cover the structure shown in FIG. 7, for example. Then, a resist film having openings may be arranged on the metal film as a mask to be used upon etching the metal film. Then, the vias 18, 19, and the wirings 21 and 22 may be formed at the same time by patterning the metal film through anisotropic etching using the resist film as a mask.

By forming the vias 18, 19, and the wirings 21 and 22 at the same time as described above, the process steps for fabricating the semiconductor pressure sensor 10 may be simplified compared to the case of separately forming the vias 18, 19, and the wirings 21 and 22. In one example, the wiring 21 may be arranged to have a thickness M1 of 1 µm, and the wiring 21 may be arranged to have a width W3 of 1 µm. Also, the wiring 22 may be arranged to have a thickness M2 of 1 µm, and the wiring 22 may be arranged to have a width W4 of 1 µm, for example. It is noted that the wirings 21 and 22 may be made of aluminum (Al), for example.

Figure 9:
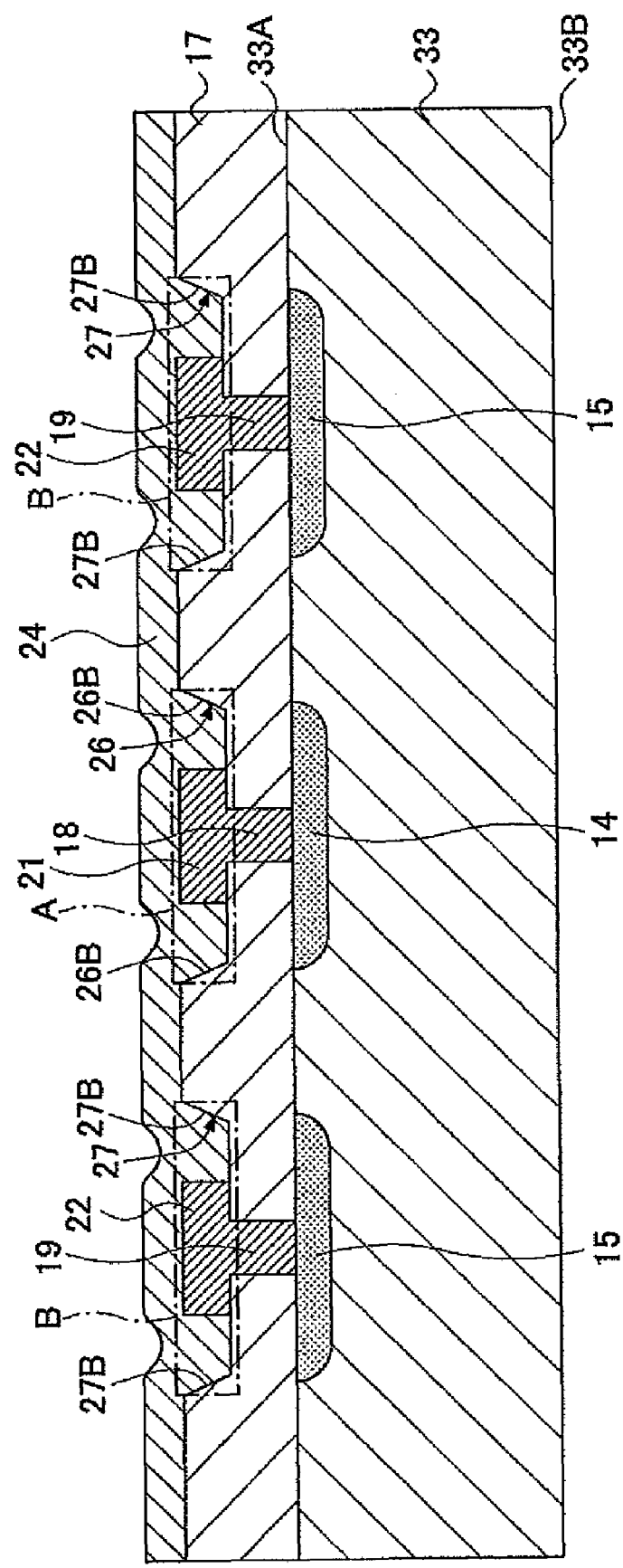
FIG. 9 is a diagram illustrating a subsequent process step to be performed after the process step of FIG. 8 for fabricating the semiconductor pressure sensor according to the first embodiment.

Next, in the process step illustrated in FIG. 9, the protective film 24 is arranged to cover the upper face of the structure shown in FIG. 8. In one example, the protective film 24 may be formed through CVD. It is noted that the protective film 24 may be made of an oxide film, for example. Also, the thickness of the protective film 24 may be 1 µm, for example.

Figure 10:
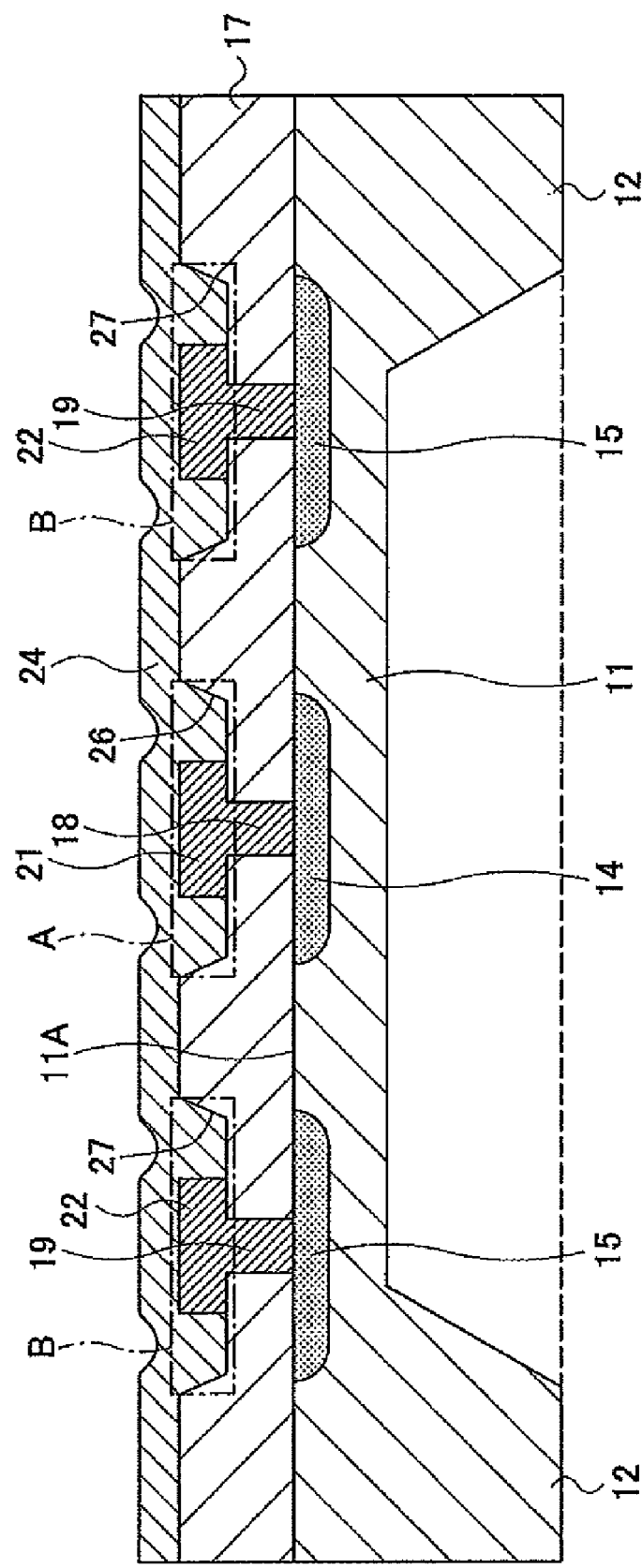
FIG. 10 is a diagram illustrating a subsequent process step to be performed after the process step of FIG. 9 for fabricating the semiconductor pressure sensor according to the first embodiment.

Next, in the process step illustrated in FIG. 10, an etching process (e.g., wet etching) is performed on the lower face 33B of the semiconductor substrate 33 shown in FIG. 9 to create the diaphragm 11 and the diaphragm supporting element 12. In this way, the semiconductor pressure sensor 10 according to the first embodiment of the present invention may be fabricated. In one example, the thickness of the diaphragm 11 may be 40 µm, and the thickness of the diaphragm supporting element 12 may be 400 µm.

Second Embodiment

Figure 11:
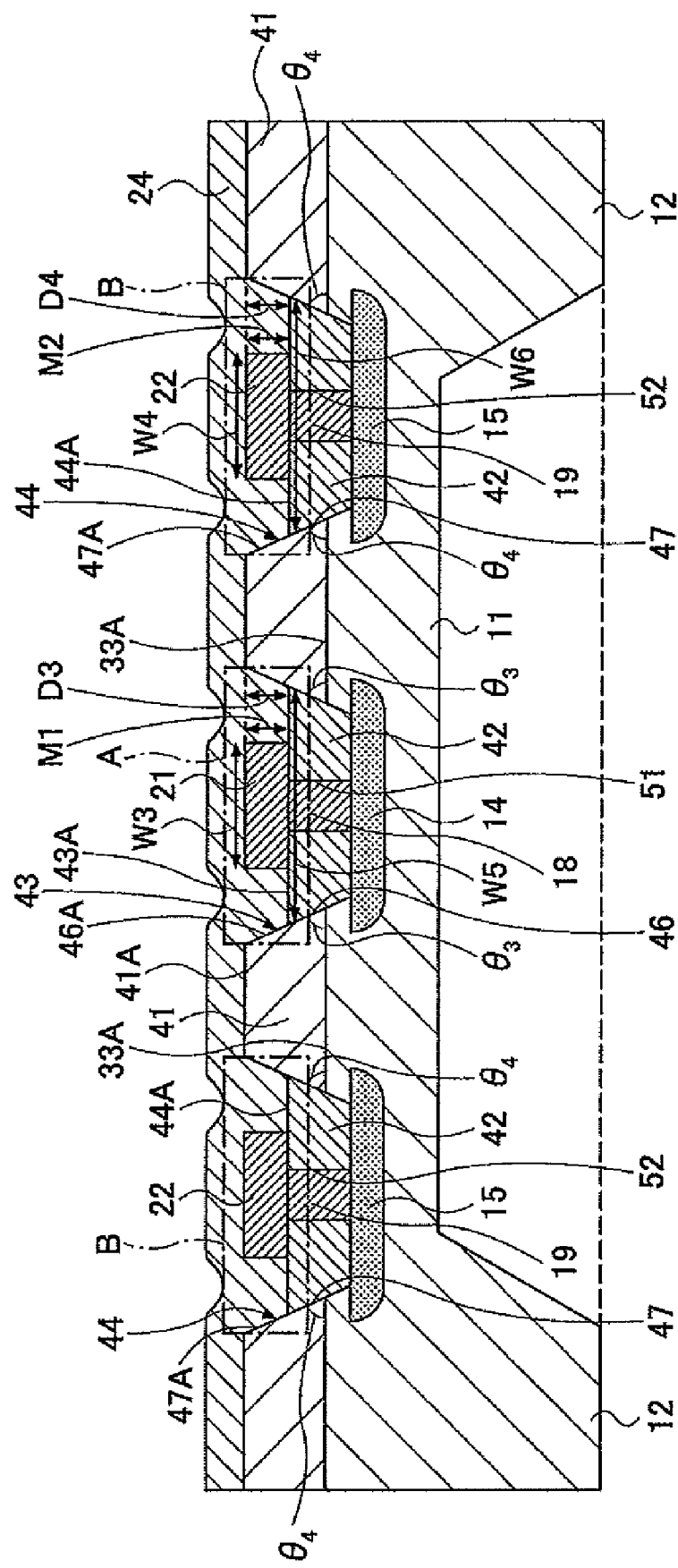
FIG. 11 is a cross-sectional view of a semiconductor pressure sensor according to a second embodiment of the present invention.

FIG. 11 is a cross-sectional view of a semiconductor pressure sensor 40 according to a second embodiment of the present invention. It is noted that in FIG. 11, component elements that are identical to those of the semiconductor pressure sensor 10 according to the first embodiment are given the same reference numbers.

As is shown in FIG. 11, the semiconductor pressure sensor 40 according to the second embodiment includes first and second insulating films 41, 42, and concave portions 43 and 44 instead of the insulating film 17 and the concave portions 26 and 27 of the semiconductor pressure sensor 10 according to the first embodiment. It is noted that other component elements of the semiconductor pressure sensor 40 according to the second embodiment may be substantially identical to those of the semiconductor pressure sensor 10 according to the first embodiment.

The first insulating film 41 is arranged on the diaphragm 11 and the diaphragm supporting element 12. The first insulating film 41 includes through holes 46 and 47. The through hole 46 is arranged to expose the upper face of the first resistive element 14. The side face 46A of the through hole 46 is arranged to be inclined so that the diameter of the opening of the through hole 46 is larger at the upper edge side of the through hole 46 and becomes smaller toward the lower edge side of the through hole 46. In one example, the angle $\theta_3$ formed by the side face 46A of the through hole 46 and the upper face of the diaphragm 11 may be 60 degrees.

By arranging the side face 46A of the through hole 46 to be inclined so that the diameter of the opening of the through hole 46 is larger at the upper edge side of the through hole 46 and becomes smaller toward the lower edge side of the through hole 46, the protective film 24 may be arranged to adequately fill the space created between the side face 46A of the through hole 46 and the wiring 21.

The through hole 47 is arranged to expose the upper face of the second resistive element 15. The side face 47A of the through hole 47 is arranged to be inclined so that the diameter of the opening of the through hole 47 is larger at the upper edge side of the through hole 47 and becomes smaller toward the lower edge side of the through hole 47. In one example, the angle $\theta_4$ formed by the side face 47A of the through hole 47 and the upper face of the diaphragm 11 may be 60 degrees.

By arranging the side face 47A of the through hole 47 to be inclined so that the diameter of the opening of the through hole 47 is larger at the upper edge side of the through hole 47 and becomes smaller toward the lower edge side of the through hole 47, the protective film 24 may be arranged to adequately fill the space created between the side face 47A of the through hole 47 and the wiring 22. It is noted that the thickness of the first insulating film 41 having the above-described configuration may be 1 µm, for example.

The second insulating film 42 is created by performing thermal oxidation on the first and second resistive elements 14 and 15 (i.e., semiconductor substrate 33 made of silicon) that are exposed by the through holes 46 and 47, respectively. The second insulating film 42 that is arranged at the wiring region A includes a through hole 51. The through hole 51 is arranged to penetrate through the second insulating film 42 and expose the upper face of the first resistive element 14. The upper face of the second insulating film 42 at the wiring region A corresponds to the bottom face 43A of the concave portion 43 and is arranged into a substantially flat surface. The insulating film 42 that is arranged at the wiring region B includes a through hole 52. The through hole 52 is arranged to penetrate through the second insulating film 42 and expose the upper face of the second resistive element 15. The upper face of the second insulating film 42 at the wiring region B corresponds to the bottom face 44A of the concave portion 44 and is arranged into a substantially flat surface. It is noted that the thickness of the second insulating film 42 arranged at the wiring regions A and B may be 0.5 µm, for example.

The concave portion 43 is defined by a portion of the first insulating film 41 corresponding to the side face 46A of the through hole 46 and the upper face of the second insulating film 42 arranged within the through hole 46. The wiring 21 is formed on the bottom face of the concave portion 43. The depth D3 of the concave portion 43 is arranged to be substantially equal to the thickness M1 of the wiring 21 (i.e., the upper face of the wiring 21 formed within the concave portion 43 and the upper face 41A of the first insulating film 41 are arranged to be substantially coplanar). For example, if the thickness M1 of the wiring 21 is 1 µm, the depth D3 of the concave portion 43 may be 1 µm as well. Also, if the width W3 of the wiring 21 is 1 µm, the width W5 of the concave portion 43 may be 2 µm, for example.

By arranging the depth D3 of the concave portion 43 to be substantially equal to the thickness M1 of the wiring 21, the upper face of the wiring 21 formed on the bottom face 43A of the concave portion 43 and the upper face 41A of the first insulating film 41 may be substantially coplanar. In other words, the thickness of the structure formed on the portion of the diaphragm 11 corresponding to the wiring region A (i.e., structure including the first and second insulating films 41, 42, the via 18, and the wiring 21) and the thickness of the structure formed on the portion of the diaphragm 11 surrounding the wiring region A (i.e., the first insulating film 41) may be substantially equal. In this way, the difference in the amount of deformation occurring at the portion of the diaphragm 11 corresponding to the wiring region A and the amount of deformation occurring at the portion of the diaphragm 11 surrounding the wiring region A may be reduced so that detection accuracy may be improved for detecting the pressure applied to the diaphragm 11.

The concave portion 44 is defined by a portion of the first insulating film 41 corresponding to the side face 47A of the through hole 47 and the upper face of the second insulating film 42 arranged within the through hole 47. The wiring 22 is formed on the bottom face of the concave portion 44. The depth D4 of the concave portion 44 is arranged to be substantially equal to the thickness M2 of the wiring 22 (i.e., the upper face of the wiring 22 formed within the concave portion 44 and the upper face 41A of the first insulating film 41 are arranged to be substantially coplanar). For example, if the thickness M2 of the wiring 22 is 1 μm, the depth D3 of the concave portion 43 may be 1 μm as well. Also, if the width W4 of the wiring 22 is 1 μm, the width W6 of the concave portion 44 may be 2 μm, for example.

By arranging the depth D4 of the concave portion 44 to be substantially equal to the thickness M2 of the wiring 22, the upper face of the wiring 22 formed on the bottom face 44A of the concave portion 44 and the upper face 41A of the first insulating film 41 may be substantially coplanar. In other words, the thickness of the structure formed on the portion of the diaphragm 11 corresponding to the wiring region B (i.e., structure including the first and second insulating films 41, 42, the via 19, and the wiring 22) and the thickness of the structure formed on the portion of the diaphragm 11 surrounding the wiring region B (i.e., the first insulating film 41) may be substantially equal. In this way, the difference in the amount of deformation occurring at the portion of the diaphragm 11 corresponding to the wiring region A and the amount of deformation occurring at the portion of the diaphragm 11 surrounding the wiring region A may be reduced so that detection accuracy may be improved for detecting the pressure applied to the diaphragm 11.

The protective film 24 is arranged to cover the wirings 21, 22, and the upper faces of the first and second insulating films 41 and 42 having the concave portions 43 and 44.

As can be appreciated from the above descriptions, in the semiconductor pressure sensor 40 according to the second embodiment of the present invention, the concave portion 43 is formed by portions of the first and second insulating films 41 and 42 corresponding to the wiring region A where the wiring 21 is formed, the depth D3 of the concave portion 43 being arranged to be substantially equal to the thickness M1 of the wiring 21; and the concave portion 44 is formed by portions of the first and second insulating films 41 corresponding to the wiring region B where the wiring 22 is formed, the depth D4 of the concave portion 44 being arranged to be substantially equal to the thickness M2 of the wiring 22. In this way, the thickness of the structures formed on the portions of the diaphragm 11 corresponding to the wiring regions A and B may be substantially equal to the thickness of the structures formed on portions of the diaphragm 11 surrounding the wiring regions A and B. In turn, the difference between the amount of deformation occurring at the portions of the diaphragm 11 corresponding to the wiring regions A and B and the amount of deformation occurring at the portions of the diaphragm 11 surrounding the wiring regions A and B may be reduced so that detection accuracy may be improved for detecting the pressure applied to the diaphragm 11.

FIGS. 12-19 are diagrams illustrating process steps for fabricating the semiconductor pressure sensor 40 according to the second embodiment of the present invention. It is noted that component elements shown in FIGS. 12-19 that are identical to those of the semiconductor pressure sensor 40 according to the second embodiment are given the same reference numbers.

Figure 12:
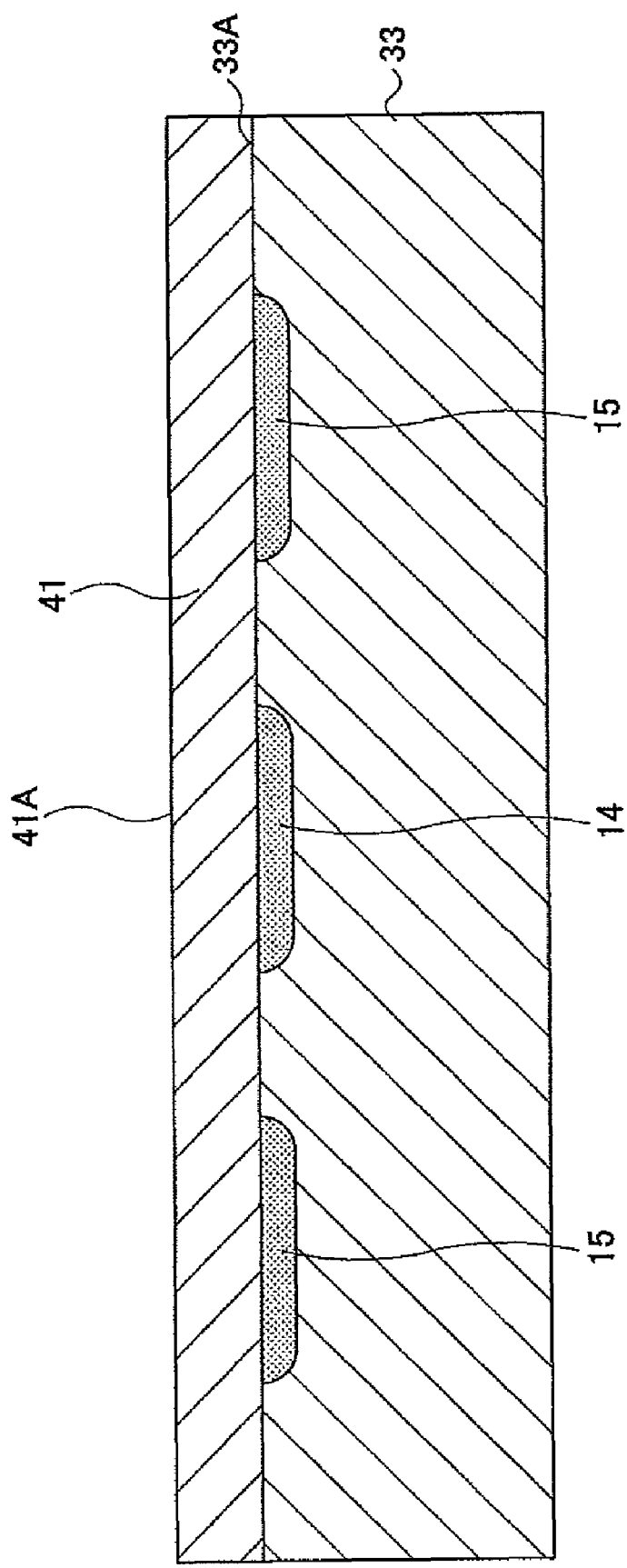
FIG. 12 is a diagram illustrating a process step for fabricating the semiconductor pressure sensor according to the second embodiment.

In the process step illustrated in FIG. 12, processes identical to those described in relation to FIG. 3 for fabricating the semiconductor pressure sensor 10 of the first embodiment are performed. Specifically, the first and second resistive elements 14 and 15 are formed at upper portions of the semiconductor substrate 33 (resistive element formation step) after which the first insulating film 41 is formed on the semiconductor substrate 33 having the resistive elements 14 and 15 formed therein (first insulating formation step). It is noted that the first insulating film 41 may be made of an oxide film, for example. The first insulating film 41 may be formed using a known film formation technique such as CVD or thermal oxidation. Also, the first insulating film 41 may be arranged to have a thickness of 1 μm, for example.

Figure 13:
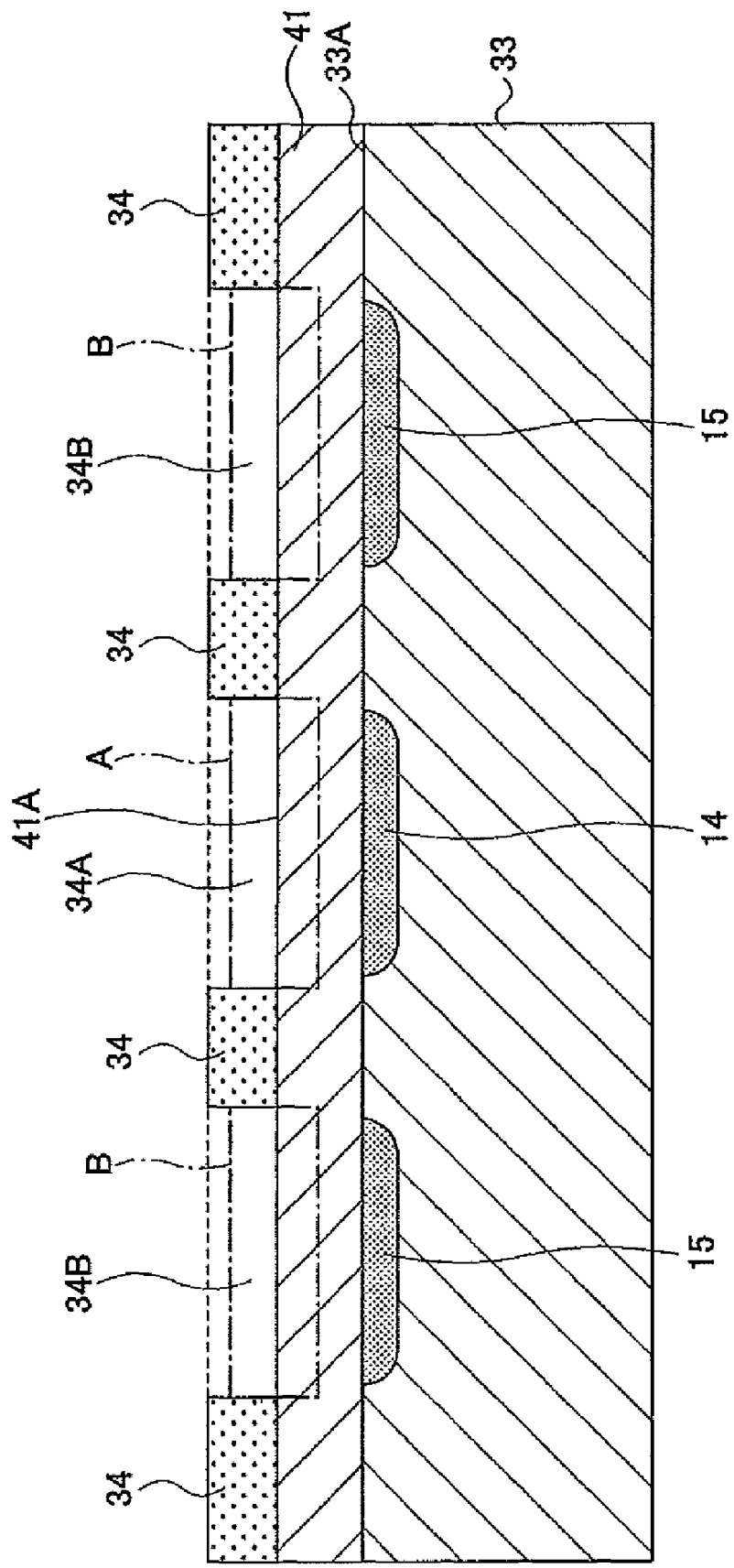
FIG. 13 is a diagram illustrating a subsequent process step to be performed after the process step of FIG. 12 for fabricating the semiconductor pressure sensor according to the second embodiment.

Next, in the process step illustrated in FIG. 13, a process identical to that described in relation to FIG. 4 for fabricating the semiconductor pressure sensor 10 of the first embodiment is performed to form the resist film 34 with openings 34A and 34B on the first insulating film 41.

Figure 14:
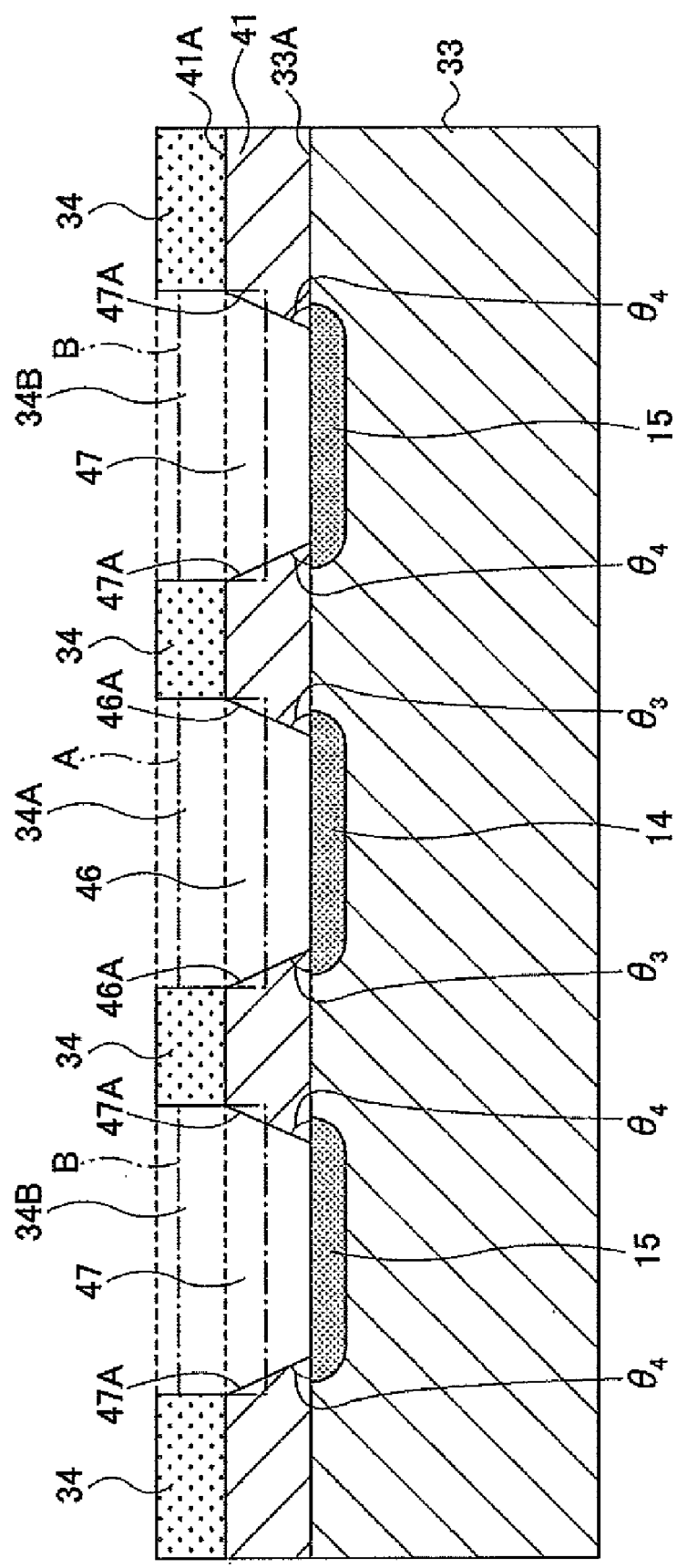
FIG. 14 is a diagram illustrating a subsequent process step to be performed after the process step of FIG. 13 for fabricating the semiconductor pressure sensor according to the second embodiment.

Next, in the process step illustrated in FIG. 14, the resist film 34 is used as a mask to etch (e.g., through dry etching or wet etching) the first insulating film 41 until the upper faces of the first and second resistive elements 14 and 15 are exposed to thereby form the through hole 46 at the portion of the first insulating film 41 corresponding to the wiring region A and to form the through hole 47 at the portion of the first insulating film 41 corresponding to the wiring region B (through hole formation step). It is noted that the first insulating film 41 and the first and second resistive elements 14 and 15 have differing etching rates so that the first and second resistive elements 14 and 15 may be used as etching stoppers in the above-described process of etching the first insulating film 41 to form the through holes 46 and 47.

The side faces 46A and 47A of the through holes 46 and 47 are each arranged to be inclined so that the diameter of the openings of the through holes 46 and 47 are larger at the upper edge side and becomes smaller toward the lower edge side of the through holes 46 and 47. In this way, the protective film 24 may be arranged to adequately fill the space created between the side face 46A of the through hole 46 and the wiring 21 and the space created between the side face 47A of the through hole 47 and the wiring 22. In one example, the angle $\theta_3$ formed by the side face 46A of the through hole 46 and the upper face 33A of the semiconductor substrate 33 may be 60 degrees, and the angle $\theta_4$ formed by the side face 47A of the through hole 47 and the upper face 33A of the semiconductor substrate 33 may be 60 degrees.

Figure 15:
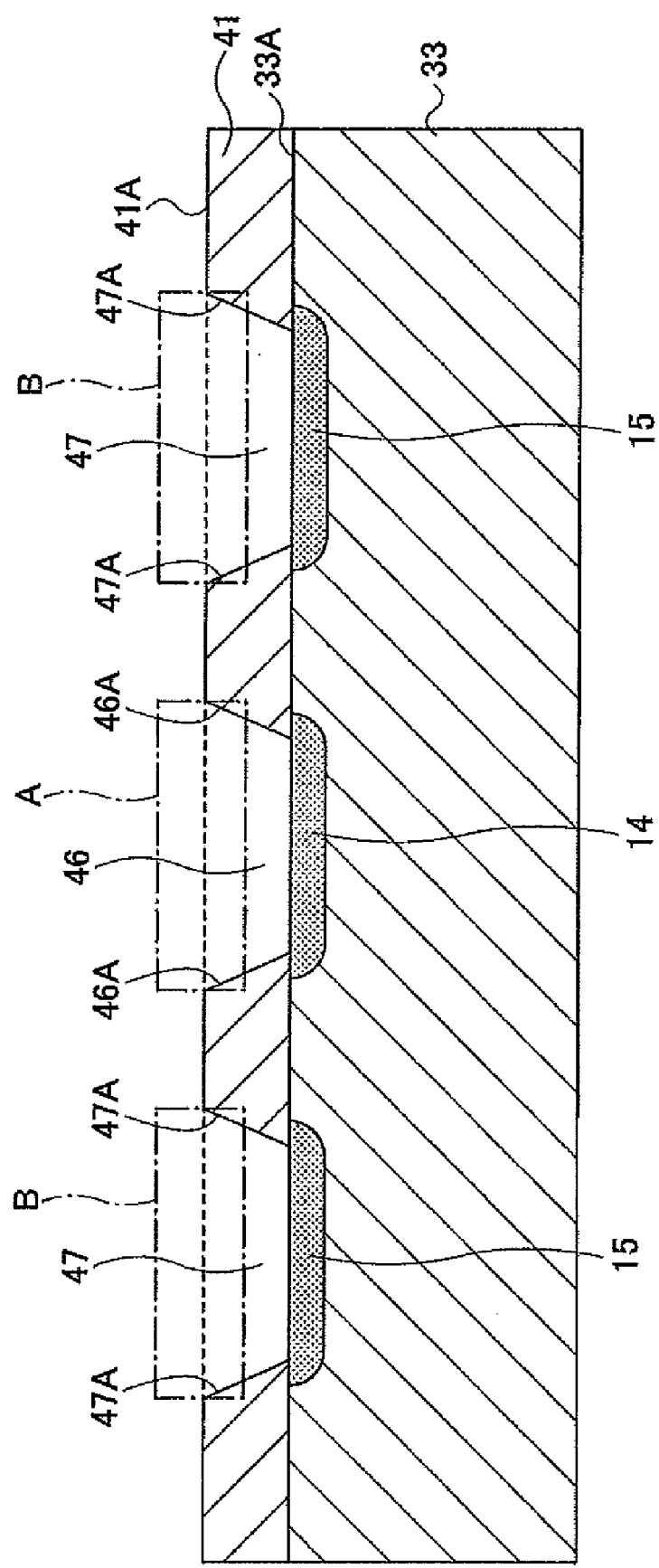
FIG. 15 is a diagram illustrating a subsequent process step to be performed after the process step of FIG. 14 for fabricating the semiconductor pressure sensor according to the second embodiment.

Next, in the process step illustrated in FIG. 15, the resist film 34 shown in FIG. 13 is removed. Then, in the process step illustrated in FIG. 16, thermal oxidation is performed on portions of the first and second resistive elements 14 and 15 that are exposed by the through holes 46 and 47 to form the second insulating film 42 on the exposed first and second resistive elements 14 and 15 of the structure shown in FIG. 15. In this way, the concave portion 43 may be formed by the second insulating film 42 that is arranged at the wiring region A, and the concave F; portion 44 may be formed by the second insulating film 42 that is arranged at the wiring region B (concave portion formation step).

By performing thermal oxidation on portions of the first and second resistive elements 14 and 15 exposed by the through holes 46 and 47 to form the second insulating film 42 defining the bottom faces of the concave portions 43 and 44, the depths D3 and D4 of the concave portions 43 and 44 may be more accurately controlled compared to the case of performing the process step of FIG. 5 in which etching of the insulating film 17 is stopped midway to form the concave portions 26 and 27 within the insulating film 17. In other words, more accurate control may be enabled in the present embodiment to arrange the upper faces of the wirings 21 and 22 formed within the concave portions 43 and 44 to be coplanar with the upper face 41A of the first insulating film 41. In this way, the difference between the amount of deformation occurring at the portion of the diaphragm 11 corresponding to the wiring region A and the amount of deformation occurring at the portion of the diaphragm 11 surrounding the wiring region A may be substantially reduced to zero, and the difference in the amount of deformation occurring at the portion of the diaphragm 11 corresponding to the wiring region B and the amount of deformation occurring at the portion of the diaphragm 11 surrounding the wiring region B may also be substantially reduced to zero so that detection accuracy may be further improved for detecting the pressure applied to the diaphragm 11.

In the present embodiment, the depth D3 of the concave portion 43 is arranged to be substantially equal to the thickness M1 of the wiring 21. For example, if the thickness M1 of the wiring 21 is 1 µm, the depth D3 of the concave portion 43 may be 1 µm as well. Also, if the width W3 of the wiring 21 is 1 µm, the width W5 of the bottom portion of the concave portion 43 may be 2 µm. Similarly, the depth D4 of the concave portion 44 is arranged to be substantially equal to the thickness M2 of the wiring 22. For example, if the thickness M2 of the wiring 22 is 1 µm, the depth D4 of the concave portion 44 may be 1 µm as well. Also, if the width W4 of the wiring 22 is 1 µm, the width W6 of the bottom portion of the concave portion 44 may be 2 µm.

Figure 17:
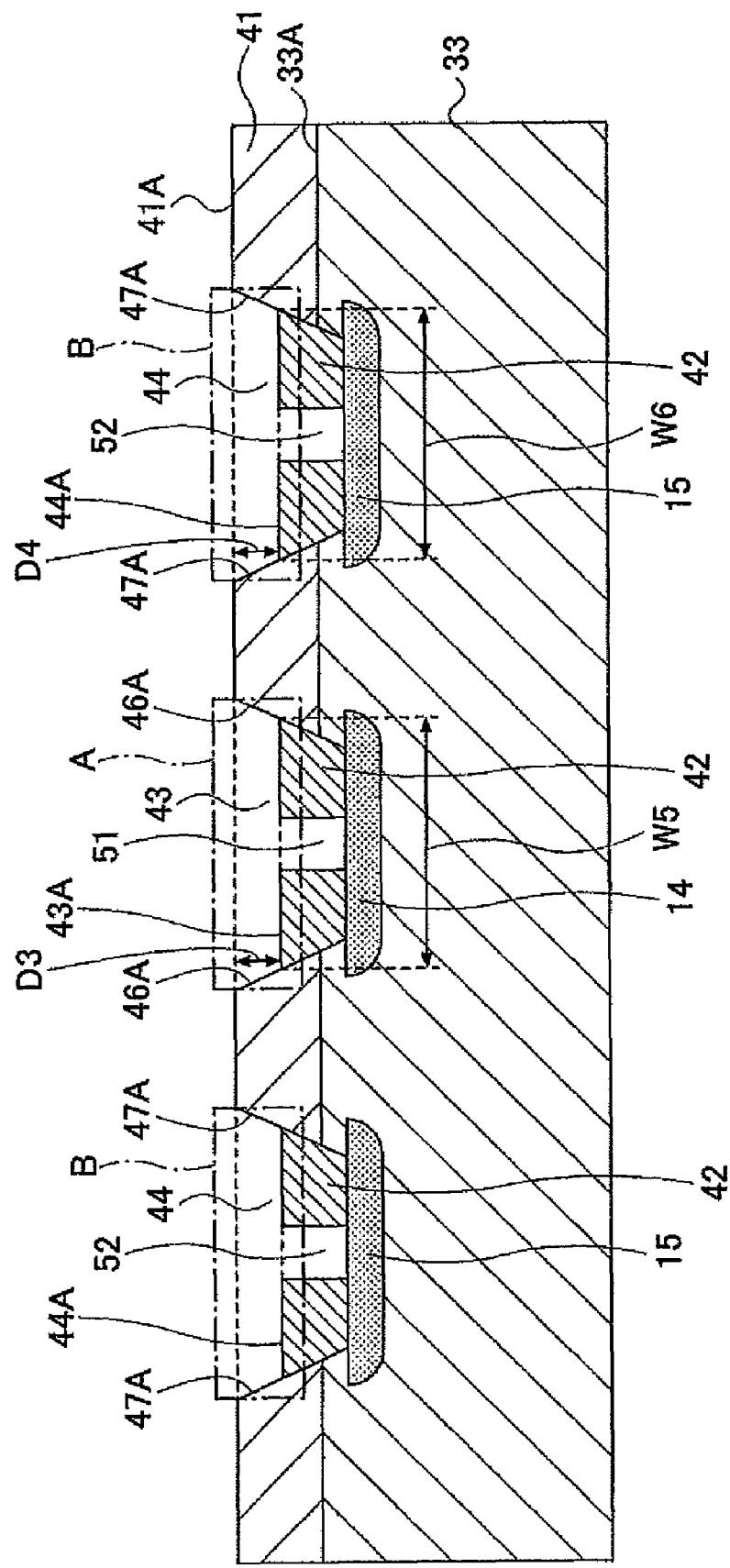
FIG. 17 is a diagram illustrating a subsequent process step to be performed after the process step of FIG. 16 for fabricating the semiconductor pressure sensor according to the second embodiment.
Figure 18:
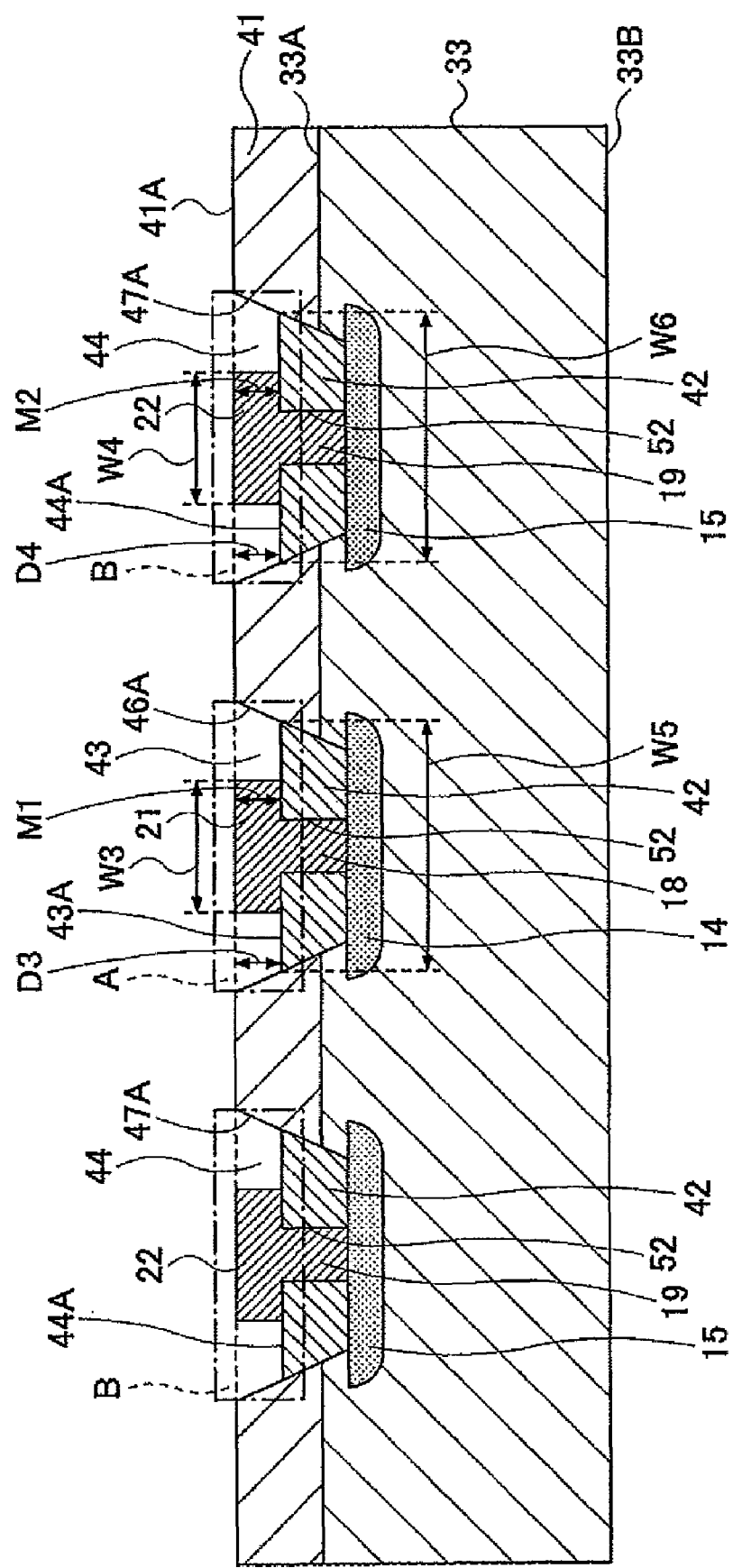
FIG. 18 is a diagram illustrating a subsequent process step to be performed after the process step of FIG. 17 for fabricating the semiconductor pressure sensor according to the second embodiment.

Next, in the process step illustrated in FIG. 17, a process similar to that described in relation to FIG. 7 for fabricating the semiconductor pressure sensor 10 of the first embodiment is performed to form the through holes 51 and 52 at the second insulating film 42. Then, in the process step illustrated in FIG. 18, a process similar to that described in relation to FIG. 8 is performed to form the vias 18, 19, and the wirings 21 and 22 at the same time (via formation step and wiring formation step).

It is noted that by forming the vias 18, 19, and the wirings 21 and 22 at the same time, the process steps for fabricating the semiconductor pressure sensor 40 according to the second embodiment may be simplified compared to the case of separately forming the vias 18, 19, and the wirings 21 and 22.

Figure 19:
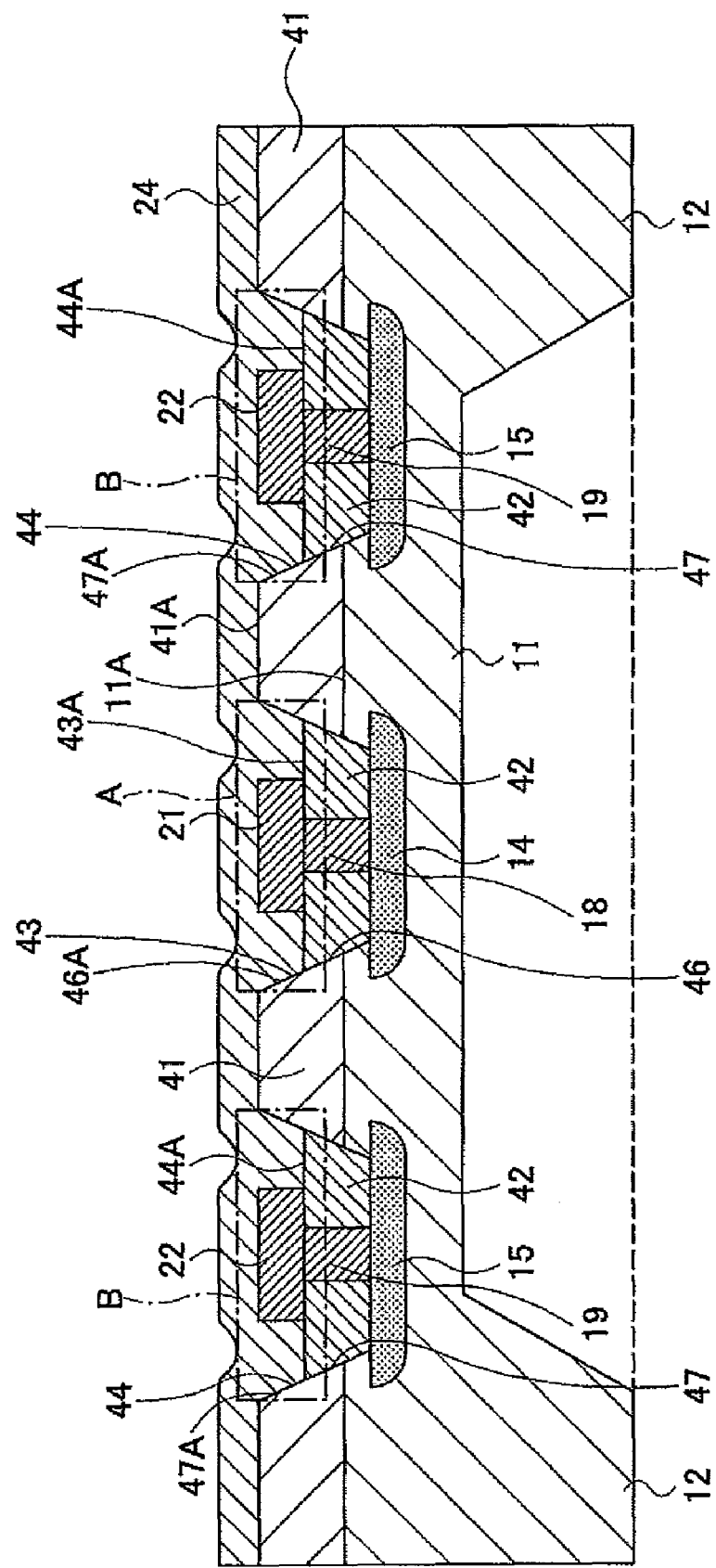
FIG. 19 is a diagram illustrating a subsequent process step to be performed after the process step of FIG. 18 for fabricating the semiconductor pressure sensor according to the second embodiment.

Next, in the process step illustrated in FIG. 19, a process similar to that described above in relation to FIG. 9 is performed to form the protective film 24 over the structure shown in FIG. 17 (protective film formation step). Then, a process similar to that described in relation to FIG. 10 is performed to etch the semiconductor substrate 33 and create the diaphragm 11 and the diaphragm supporting element 12. In this way, the semiconductor pressure sensor 40 according to the second embodiment may be fabricated.

According to the method of fabricating the semiconductor pressure sensor 40 of the second embodiment, through holes 46 and 47 are formed at the first insulating film 41 to expose portions of the first and second resistive elements 14 and 15. Then, thermal oxidation is performed on the portions of the first and second resistive elements 14 and 15 exposed by the through holes 46 and 47, and the second insulating film 42 is formed to define the bottom portions of the concave portions 43 and 44. By using such a fabrication method as opposed to the fabrication method of the first embodiment which involves stopping the process of etching the insulating film 17 midway to form the concave portions 26 and 27 (see FIG. 5), the depths D3 and D4 of the concave portions 43 and 44 may be more accurately controlled to thereby arrange the upper faces of the wirings 21 and 22 formed within the concave portions 43 and 44 to be substantially coplanar with the upper face 41A of the first insulating film 41, for example.

In this way, the difference between the amount of deformation occurring at the portion of the diaphragm 11 corresponding to the wiring region A and the amount of deformation occurring at the portion of the diaphragm 11 surrounding the wiring region A may be substantially reduced to zero. Similarly, the difference in the amount of deformation occurring at the portion of the diaphragm 11 corresponding to the wiring region B and the amount of deformation occurring at the portion of the diaphragm 11 surrounding the wiring region B may also be substantially reduced to zero so that detection accuracy may be further improved for detecting the pressure applied to the diaphragm 11.

Figure 16:
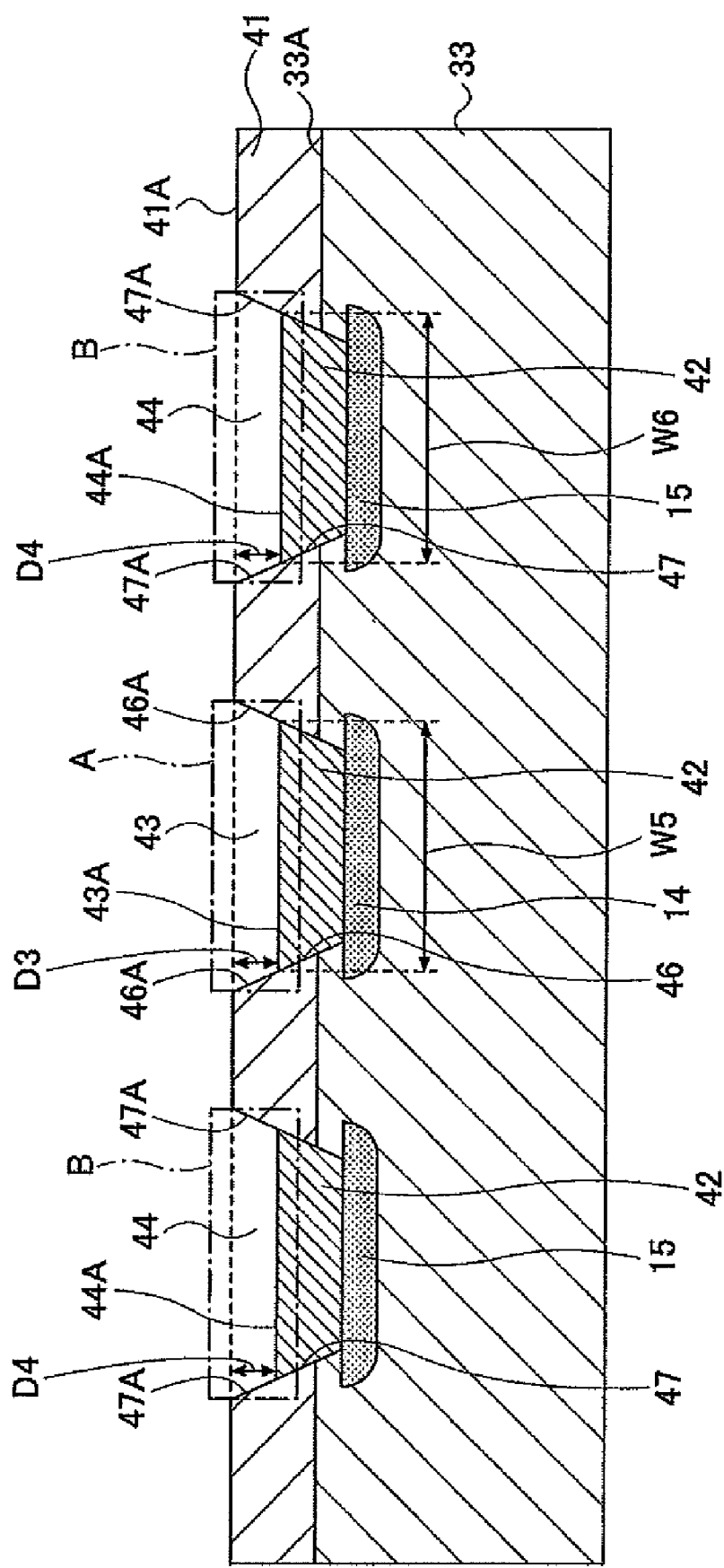
FIG. 16 is a diagram illustrating a subsequent process step to be performed after the process step of FIG. 15 for fabricating the semiconductor pressure sensor according to the second embodiment.

It is noted that although a thermal oxide film is used as the second insulating film 42 in the above-described embodiment of the present invention, the present invention is by no way limited to such an embodiment. In one alternative embodiment, an oxide film formed through CVD may be used as the second insulating film 42 instead of a thermal oxide film. In this case, instead of performing the process step as illustrated in FIG. 16, a CVD process may be performed to form an oxide film on the exposed portions of the first and second resistive elements 14 and 15 of the structure shown in FIG. 15, and an etch-back process may be performed on the oxide film to remove portions of the oxide film protruding from the upper face 41A of the first insulating film 41 and adjust the depths D3 and D4 of the concave portions 43 and 44. Then, process steps similar to those illustrated in FIGS. 17-19 may be performed on the etch-back processed oxide film to fabricate a semiconductor pressure sensor according to an embodiment of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

Although the present invention is described above with respect to certain preferred embodiments, the present invention is not limited to these embodiments, and variations and modifications may be made without departing from the scope of the present invention.

The present application is based on and claims the benefit of the earlier filing date of Japanese Patent Application No. 2007-201148 filed on Aug. 1, 2007, the entire contents of which are hereby incorporated by reference.

What is claimed is:

1. A semiconductor pressure sensor comprising:
a diaphragm;
a resistive element arranged at an upper portion of the diaphragm;
an insulating film arranged on an upper face of the resistive element and an upper face of the diaphragm;
a via that penetrates through a portion of the insulating film and comes into contact with the resistive element; and wiring that is electrically connected to the resistive element through the via;

wherein the insulating film includes a concave portion having a bottom face that is substantially flat;

the wiring is arranged on the bottom face of the concave portion; and a depth of the concave portion is substantially equal to a thickness of the wiring.

2. The semiconductor pressure sensor as claimed in claim 1, wherein a side face of the concave portion is inclined such that a diameter of an opening of the concave portion toward the bottom face of the concave portion is smaller than a diameter of the opening toward an upper edge of the concave portion.

3. The semiconductor pressure sensor as claimed in claim 1, further comprising:

a protective film arranged over the insulating film and the wiring.

4. A method of fabricating a semiconductor pressure sensor including a diaphragm, a resistive element arranged at the diaphragm, and wiring that is electrically connected to the resistive element through a via, the method comprising:

a resistive element formation step of forming the resistive element at an upper portion of a semiconductor substrate corresponding to a base material of the diaphragm;

a first insulating film formation step of forming a first insulating film on an upper face of the semiconductor substrate that has the resistive element formed by the resistive element formation step;

a through hole formation step of etching a portion of the first insulating film and forming a through hole that penetrates through the first insulating film and exposes a portion of the resistive element;

a concave portion formation step of forming a second insulating film on the portion of the resistive element exposed by the through hole, and forming a concave portion having a bottom face that is defined by an upper face of the second insulating film and a depth that is substantially equal to a thickness of the wiring to be formed at the concave portion;

a via formation step of forming the via that penetrates through a portion of the second insulating film and comes into contact with the resistive element;

a wiring formation step of forming the wiring on the bottom face of the concave portion; and a diaphragm formation step of forming the diaphragm by etching the semiconductor substrate after the wiring formation step.

5. The method as claimed in claim 4, wherein the via formation step and the wiring formation step are performed at the same time.

6. The method as claimed in claim 4, further comprising:

a protective film formation step of forming a protective film over the first insulating film, the second insulating film, and the wiring, which protective film formation step is performed between the wiring formation step and the diaphragm formation step.

* * * * *